(12) United States Patent
Dubois et al.

(10) Patent No.: US 11,780,521 B2
(45) Date of Patent: Oct. 10, 2023

(54) TELESCOPIC BICYCLE SEATPOST WITH ADJUSTABLE UNCOMPRESSED RESTING HEIGHT

(71) Applicant: The Hive Global, Inc., Taichung (TW)

(72) Inventors: George Dubois, San Luis Obispo, CA (US); Joel Peters, Taichung (TW); Greg Thrash, Petaluma, CA (US)

(73) Assignee: The Hive Global, Inc., Taichung (TW)

( * ) Notice: Subject to any disclaimer, the term of this patent is extended or adjusted under 35 U.S.C. 154(b) by 0 days.

(21) Appl. No.: 17/028,914

(22) Filed: Sep. 22, 2020

(65) Prior Publication Data
US 2021/0094642 A1 Apr. 1, 2021

Related U.S. Application Data

(60) Provisional application No. 63/065,971, filed on Aug. 14, 2020, provisional application No. 62/907,448, filed on Sep. 27, 2019.

(51) Int. Cl.
*B62J 1/08* (2006.01)
*B62J 1/06* (2006.01)

(52) U.S. Cl.
CPC . *B62J 1/08* (2013.01); *B62J 1/06* (2013.01); *B62J 2001/085* (2013.01)

(58) Field of Classification Search
CPC .................................................. B62J 2001/085
See application file for complete search history.

(56) References Cited

U.S. PATENT DOCUMENTS

| 2,139,176 | A | 12/1938 | Sims |
| 8,267,417 | B1 | 9/2012 | Yamanaka |
| 8,393,794 | B1 | 3/2013 | Shiraishi |
| 9,517,811 | B1 | 12/2016 | Shiraishi |
| 10,053,173 | B1 * | 8/2018 | Metz ..................... B62K 19/36 |
| 2004/0162172 | A1 | 8/2004 | Yamanaka |
| 2006/0066074 | A1 | 3/2006 | Turner |
| 2006/0117905 | A1 | 6/2006 | Yamanaka |
| 2007/0062328 | A1 | 3/2007 | Shiraishi |

(Continued)

FOREIGN PATENT DOCUMENTS

| CN | 107351946 A | * | 11/2017 | |
| CN | 108482537 A | * | 9/2018 | ................ B62J 1/08 |

(Continued)

OTHER PUBLICATIONS

The International Preliminary Report on Patentability for PCT Application No. PCT/US2021/041529.

(Continued)

*Primary Examiner* — Timothy J Brindley
(74) *Attorney, Agent, or Firm* — Haverstock & Owens, A Law Corporation

(57) ABSTRACT

A telescopic bicycle seatpost is adjustable to fit on many different bicycle sizes, for riders of different heights and leg length. The telescopic length of the seatpost is able to be adjusted after the seatpost has been installed on the bicycle and without removing the seatpost from the frame, which enables the frame and seatpost combination to be quickly adjusted for different users of the same bicycle, in instances where the bicycle is shared between two or more riders or is used as part of a rental fleet.

11 Claims, 36 Drawing Sheets

(56) References Cited

U.S. PATENT DOCUMENTS

| | | | |
|---|---|---|---|
| 2007/0241530 A1 | 10/2007 | Nonoshita | |
| 2008/0314193 A1 | 12/2008 | Meggiolan | |
| 2011/0204201 A1 | 8/2011 | Kodama | |
| 2015/0020621 A1 | 1/2015 | Kawakami | |
| 2018/0148126 A1 | 5/2018 | Tetsuka | |
| 2018/0170479 A1 | 6/2018 | Furuya | |
| 2018/0334212 A1 | 11/2018 | Bowers | |
| 2019/0093749 A1 | 3/2019 | Bisarello | |
| 2019/0300089 A1* | 10/2019 | Jordan | B62K 19/36 |
| 2019/0367114 A1* | 12/2019 | Winefordner | B62J 1/08 |
| 2021/0171153 A1 | 6/2021 | Nichols | |
| 2022/0001947 A1* | 1/2022 | Bond | B62J 1/08 |
| 2022/0097793 A1* | 3/2022 | Song | B62K 19/36 |

FOREIGN PATENT DOCUMENTS

| | | | | |
|---|---|---|---|---|
| CN | 110126944 A | * | 8/2019 | |
| CN | 111098965 A | * | 5/2020 | |
| CN | 111846043 A | * | 10/2020 | |
| CN | 112606930 A | * | 4/2021 | B62J 1/08 |
| CN | 113147981 A | * | 7/2021 | B62J 1/08 |
| DE | 202022101937 U1 | * | 6/2022 | |
| EP | 3950471 A1 | * | 2/2022 | B62J 1/08 |
| EP | 3957553 A1 | * | 2/2022 | B62J 1/08 |
| JP | 2019142351 A | | 8/2019 | |
| TW | 201507920 | | 3/2015 | |
| TW | M576558 | † | 4/2019 | |
| WO | WO-2021035272 A1 | * | 3/2021 | B62J 1/02 |

OTHER PUBLICATIONS

Invention Patent Decision dated Oct. 24, 2022 of the Intellectual Property Office of the Ministry of Economic Affairs in Taiwan Application No. 109133450.
International Search Report, dated Jun. 9, 2022, for International Application No. PCT/US22/21360.
Machine Translation of JP 2019142351.
The Examination Notification dated Jun. 28, 2022 for Taiwanese Application No. 107129023.
The Official Letter dated Oct. 6, 2022 for European Application No. 17770865.8.

\* cited by examiner
† cited by third party

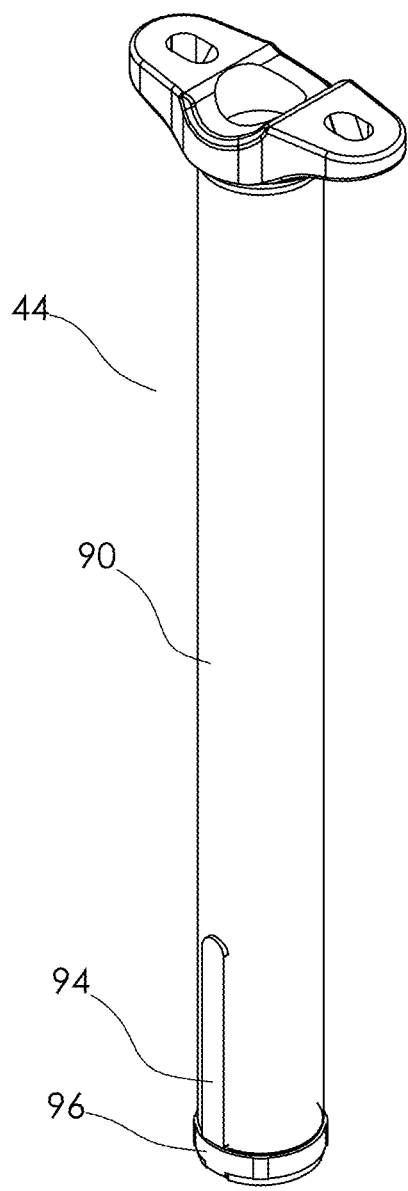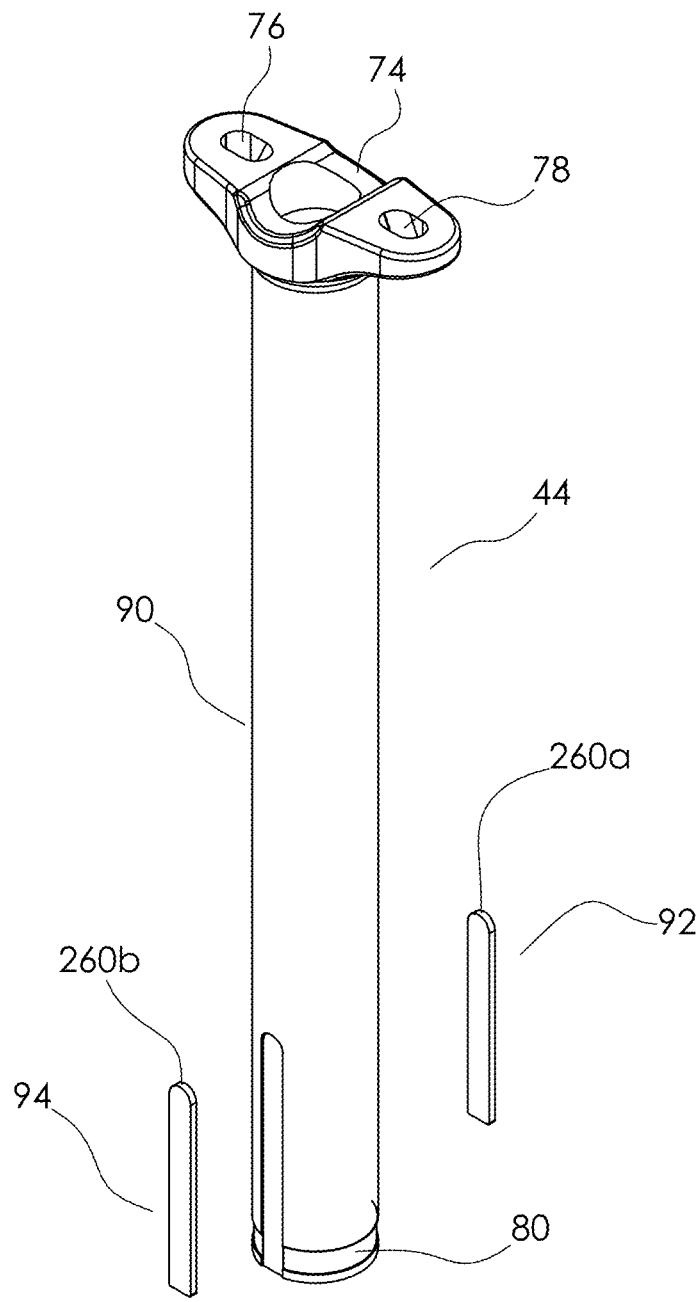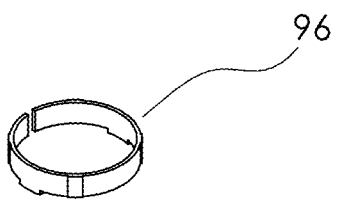

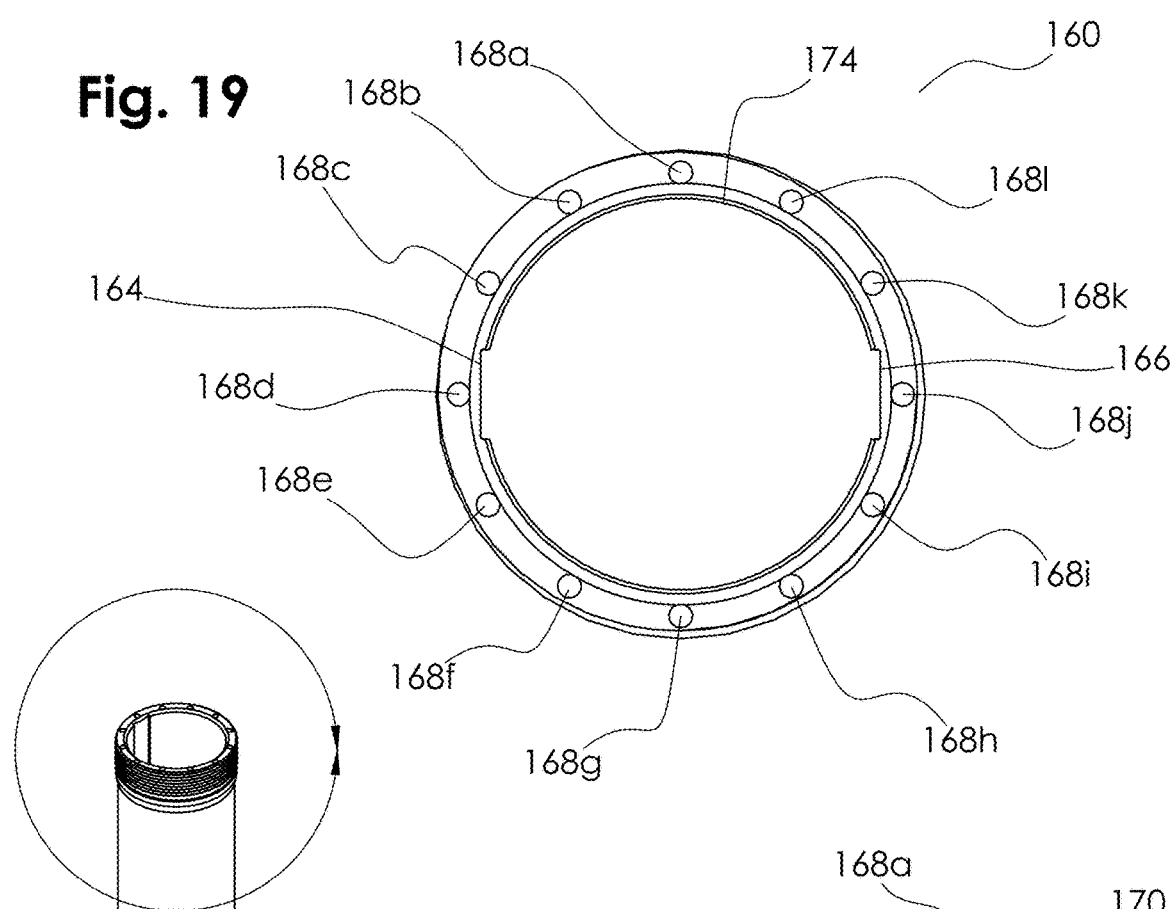
Fig. 19
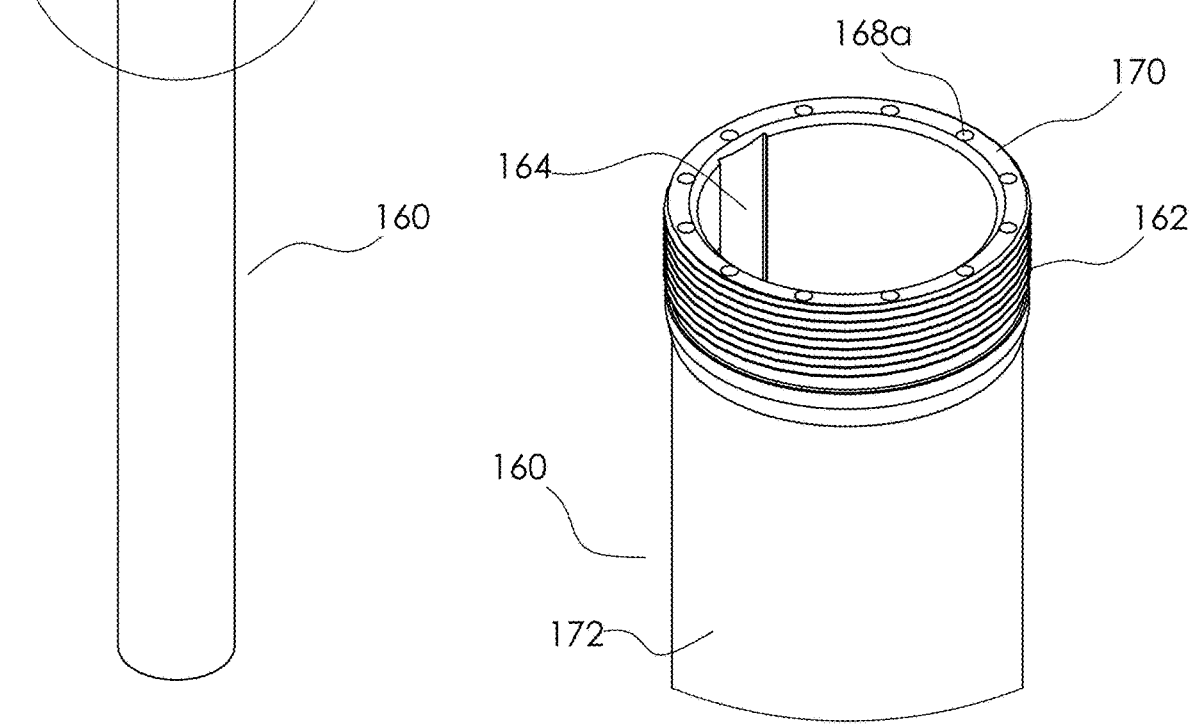
Fig. 20
Fig. 21

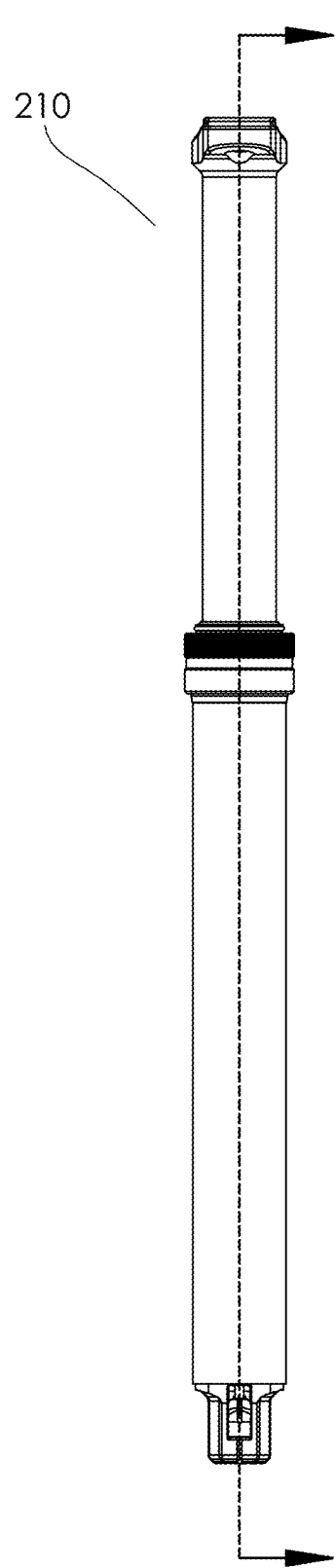 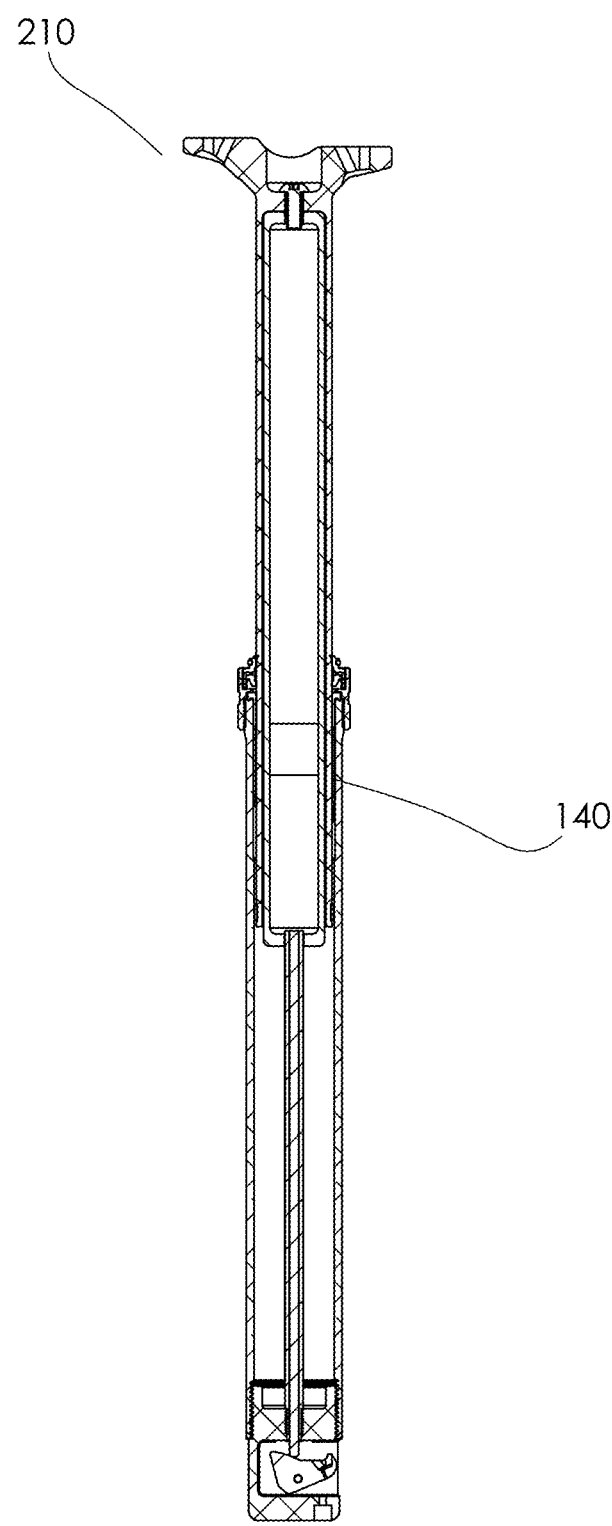
Fig. 29  Fig. 30

Fig. 38
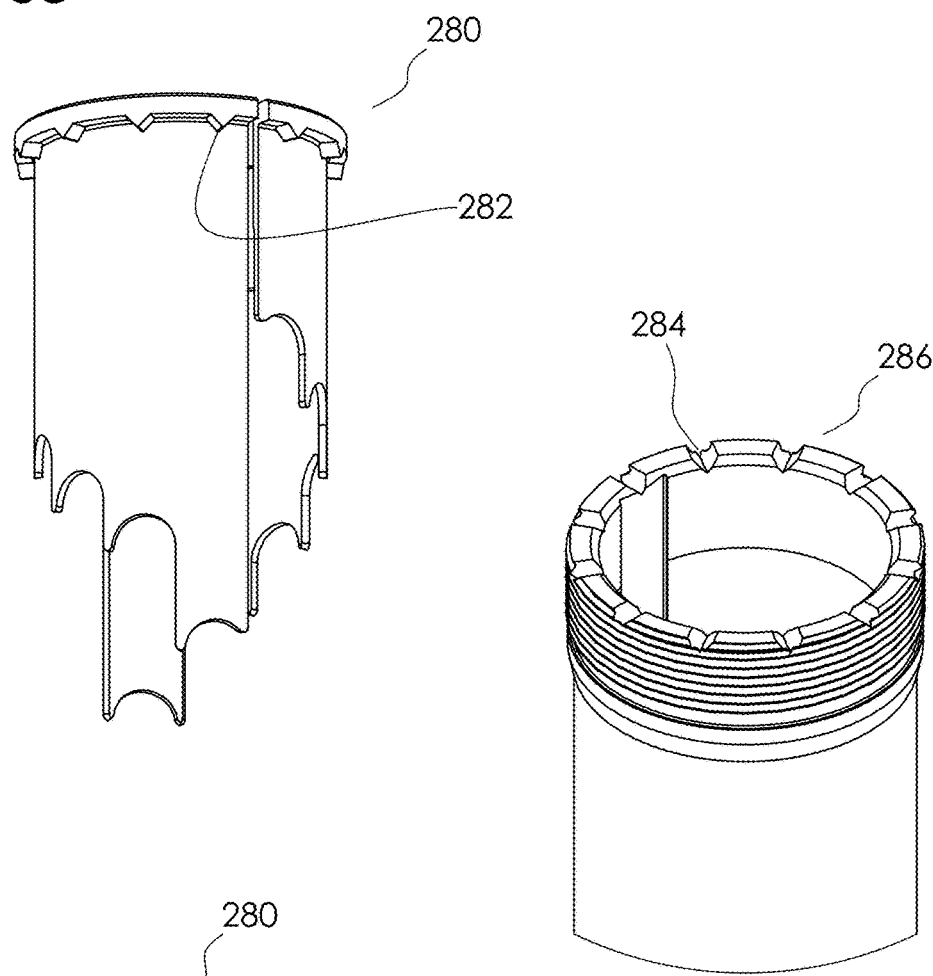
Fig. 39
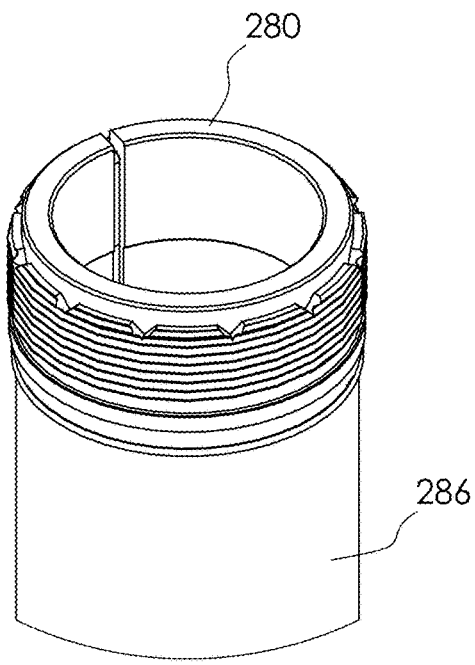
Fig. 40

Fig. 41
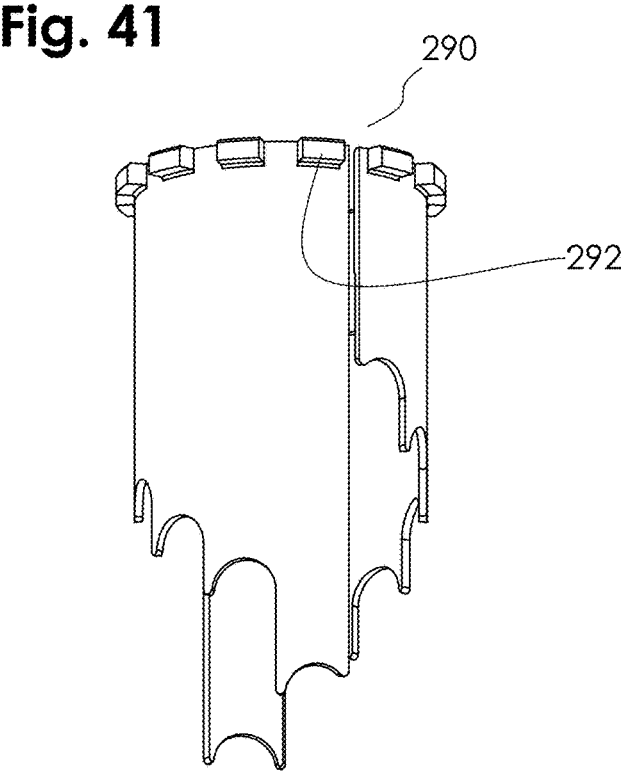
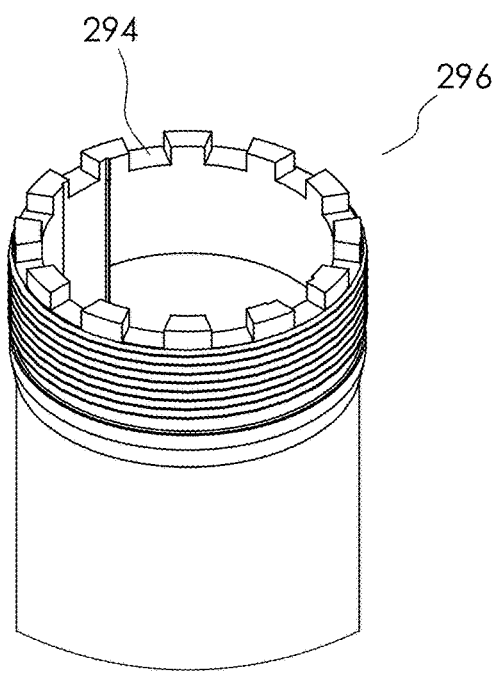
Fig. 42
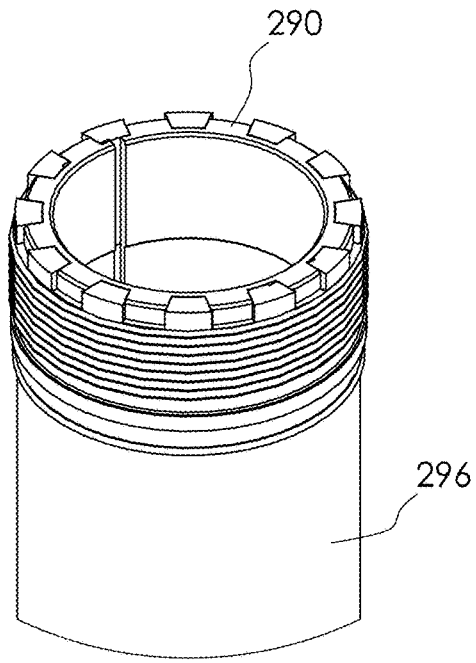
Fig. 43

TELESCOPIC BICYCLE SEATPOST WITH ADJUSTABLE UNCOMPRESSED RESTING HEIGHT

RELATED APPLICATIONS

This Patent Application claims priority under 35 U.S.C. 119(e) of the U.S. provisional patent application, Application No. 62/907,448, filed on Sep. 27, 2019, and entitled "TELESCOPIC BICYCLE SEATPOST WITH ADJUSTABLE UNCOMPRESSED RESTING HEIGHT," and the U.S. provisional patent application, Application No. 63/065,971, filed on Aug. 14, 2020, and entitled "TELESCOPIC BICYCLE SEATPOST WITH ADJUSTABLE UNCOMPRESSED RESTING HEIGHT," which are both hereby incorporated in their entirety by reference.

FIELD OF THE INVENTION

The present invention is generally directed to a bicycle seatpost. More specifically, the present invention is directed to a bicycle seatpost structure and a method of setting an uncompressed resting length of the bicycle seatpost.

BACKGROUND OF THE INVENTION

Many bicycles today use a telescopic seatpost, which allows for the height of the seat to be varied or adjusted during the course of a ride to suit riding over different kinds of terrain. For instance, on steep and/or rocky descents a cyclist might compress the seatpost on the fly, without stopping forward progress and lower the saddle so that the rider is able to move their body rearward over the bicycle to obtain better leverage or riding position. Conversely, the rider might raise the saddle to its full height while on riding on flat terrain and while climbing to enable full leg extension while the rider is in the seated position on the saddle.

For a given bicycle frame, it is advantageous for a rider to use a telescopic seatpost with a maximum amount of height adjustment for the bicycle frame. However, because the saddle height is often set to accommodate the length of the rider's legs, if a telescopic seatpost with a fixed telescoping length is used, then some telescoping length must be sacrificed to allow a varying length of insertion of the seatpost into the frame for the optimal bicycle fit.

Consequently, seatpost manufacturers must frequently make the telescopic seatposts in different lengths to enable riders of different heights to fit their bicycle properly. Additionally, regardless of which seatpost is selected, some telescopic length must be sacrificed because the seatposts are typically manufactured with 2-4 length choices in 20-30 mm increments as it becomes impractical to make such seatposts in finer graduations of length.

SUMMARY OF THE INVENTION

A telescopic bicycle seatpost that may be fit on many different bicycle sizes, for riders of different heights and leg length, while maximizing the telescoping length of the seatpost for each situation and without requiring many different lengths of seatposts to be manufactured. The telescoping length of the seatpost may be adjusted for riders of different heights, fit many different frame sizes and enable each rider to maximize the telescoping length of the seatpost for their particular bike and desired setup. The telescopic bicycle seatpost enables the telescopic length of the seatpost to be adjusted after the seatpost has been installed on the bicycle and without removing the seatpost from the frame, which enables the frame and seatpost combination to be quickly adjusted for different users of the same bicycle, in instances where the bicycle is shared between two or more riders or is used as part of a rental fleet.

In a first aspect, a telescopic bicycle seatpost comprises an outer tube, an adjustable bushing assembly fitted into the outer tube, wherein the adjustable bushing assembly comprises a plurality of graduation grooves and a moveable height band movable between the plurality of graduation grooves to move an uncompressed resting height of the telescopic bicycle seatpost. In some embodiments, each of the plurality of graduation grooves comprises a groove upper surface, a groove cylindrical surface and lower groove surface for locking the moveable height band in one of the plurality of graduated grooves. In some embodiments, the moveable height band comprises a band slot that is opened to free the moveable height band from one of the plurality of grooves to move the moveable band to a different graduation groove. In further embodiments, the moveable height band comprises a left band ear and a right band ear which fit into a groove bushing slot of the adjustable bushing assembly to lock the moveable height band in place. In some embodiments, the moveable height band comprises a band lock tab which fits within one of a plurality of groove bushing index holes aligned with the graduation groove that is in use.

In another aspect, a method of setting an uncompressed resting height of a bicycle seatpost comprises removing a seal cap assembly from an outer tube of the bicycle, activating an actuation cable of the seatpost so that a spring cartridge extends to its full length in a position where an adjustable bushing assembly extends from the outer tube, installing a moveable height band on one of a plurality of graduation grooves of the adjustable bushing assembly to set the bicycle seat at a desired uncompressed resting height and reinstalling the bushing assembly down onto a headtube of the bicycle. In some embodiments, each of the plurality of graduation grooves comprises a groove upper surface, a groove cylindrical surface and lower groove surface for locking the moveable height band in one of the plurality of graduated grooves. In some embodiments, the moveable height band comprises a band slot that is opened to free the moveable height band from one of the plurality of grooves to move the moveable band to a different graduation groove. In some embodiments, the moveable height band comprises a left band ear and a right band ear which fit into a groove bushing slot of the adjustable bushing assembly to lock the moveable height band in place. In further embodiments, the moveable height band comprises a band lock tab which fits within one of a plurality of groove bushing index holes aligned with the graduation groove that is in use. In some embodiments, the seatpost is not removed from the bicycle as the uncompressed resting height is set.

In a further aspect, a telescopic bicycle seatpost comprises an outer tube and an adjustable bushing assembly fitted into the outer tube, wherein a length of the adjustable bushing assembly is altered to change an uncompressed resting height of the telescopic bicycle seatpost. In some embodiments, the adjustable bushing assembly comprises a plurality of stacking adjustment rings. In some of these embodiments, the uncompressed resting height of the telescopic bicycle seatpost is adjusted by including one or more of the plurality of stacking adjustment rings. In further embodiments, the plurality of stacking adjustment rings are affixed to a stacking base bushing by flexing open the stacking adjustment rings at an adjustment ring slot and snapping the adjustment ring over a head tube shaft surface below a stacking base bushing. In some embodiments, the adjustable bushing assembly comprises a knock-out height adjustment bushing. In some of these embodiments, the knock-out height adjustment bushing comprises a plurality of knock-out bushing segments that are removed to change an uncompressed resting height of the telescopic bicycle seatpost. In further embodiments, the plurality of knock-out bushing segments are permanently removed. In some embodiments, the adjustable bushing assembly comprises a snap-together height adjustment bushing. In some of these embodiments, the snap-together height adjustment bushing comprises a snap-together bushing base and a snap-on travel stop. In further embodiments, the snap-on travel stop comprises a plurality of snap-in bosses for removably coupling with a plurality of bushing snap-holes of the snap-together bushing base.

BRIEF DESCRIPTION OF THE FIGURES

FIG. 9 shows a top right isometric view of an inner tube assembly, in accordance with some embodiments.

FIG. 10 shows an exploded view of an inner tube assembly, in accordance with some embodiments.

FIG. 19 shows a top view of an outer tube, in accordance with some embodiments.

FIG. 20 shows a right rear isometric view of the outer tube, in accordance with some embodiments.

FIG. 21 shows a detail right rear isometric view of an outer tube, in accordance with some embodiments.

FIG. 29 shows a front view of a seatpost base assembly, in accordance with some embodiments.

FIG. 30 shows a right section view of a seatpost base assembly, in accordance with some embodiments.

FIG. 38 shows a bottom isometric view of a stepped bushing, in accordance with some embodiments.

FIG. 39 shows a top isometric view of an outer tube, in accordance with some embodiments.

FIG. 40 shows a top isometric view of a stepped bushing assembled with an outer tube, in accordance with some embodiments.

FIG. 41 shows a bottom isometric view of a stepped bushing, in accordance with some embodiments.

FIG. 42 shows a top isometric view of an outer tube, in accordance with some embodiments.

FIG. 43 shows a top isometric view of a stepped bushing assembled with the outer tube, in accordance with some embodiments.

DETAILED DESCRIPTION OF THE EMBODIMENTS

Embodiments are directed to a telescopic bicycle seatpost that may be fit on many different bicycle sizes, for riders of different heights and leg length, while maximizing the telescoping length of the seatpost for each situation and without requiring many different lengths of seatposts to be manufactured. The telescoping length of the seatpost may be adjusted for riders of different heights, fit many different frame sizes and enable each rider to maximize the telescoping length of the seatpost for their particular bike and desired setup. The telescopic bicycle seatpost enables the telescopic length of the seatpost to be adjusted after the seatpost has been installed on the bicycle and without removing the seatpost from the frame, which enables the frame and seatpost combination to be quickly adjusted for different users of the same bicycle, in instances where the bicycle is shared between two or more riders or is used as part of a rental fleet.

Reference will now be made in detail to implementations of a telescopic bicycle seatpost with adjustable uncompressed resting height. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The telescopic bicycle seatpost has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiments chosen for illustration without departing from the spirit and scope of the invention.

Figure 1:
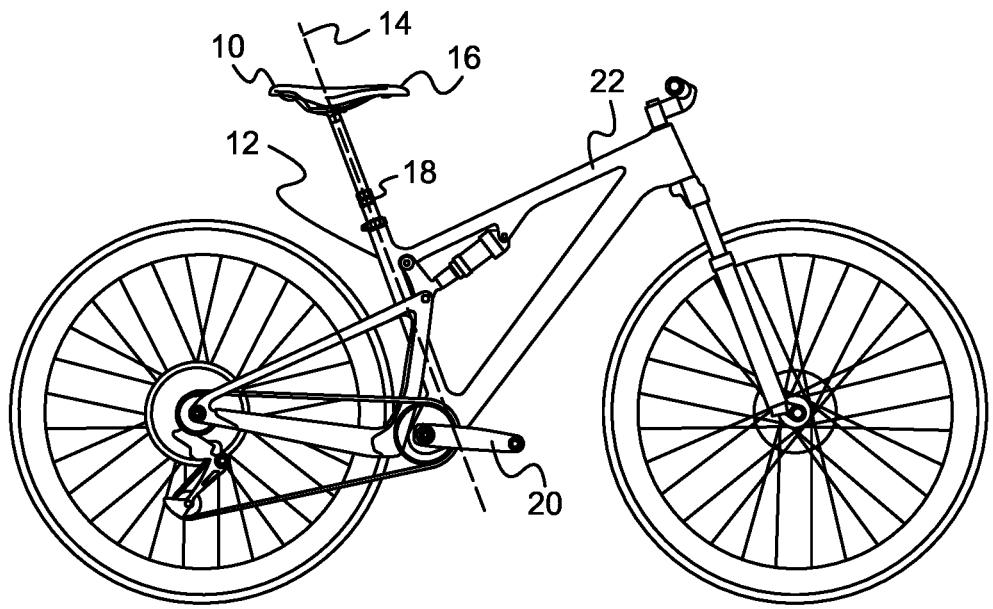
FIG. 1 shows a complete bicycle assembly, in accordance with some embodiments.

Referring now to FIG. 1, a complete bicycle assembly 10 is shown therein. The bicycle assembly 10 comprises a bicycle seat tube 12, a bicycle seat tube axis 14 and a bicycle saddle 16. A telescopic seatpost 18 is installed in the bicycle seat tube 12 and is shown in an extended configuration. A bicycle crank assembly 20 is also shown installed on the bicycle frame 22.

Figure 2:
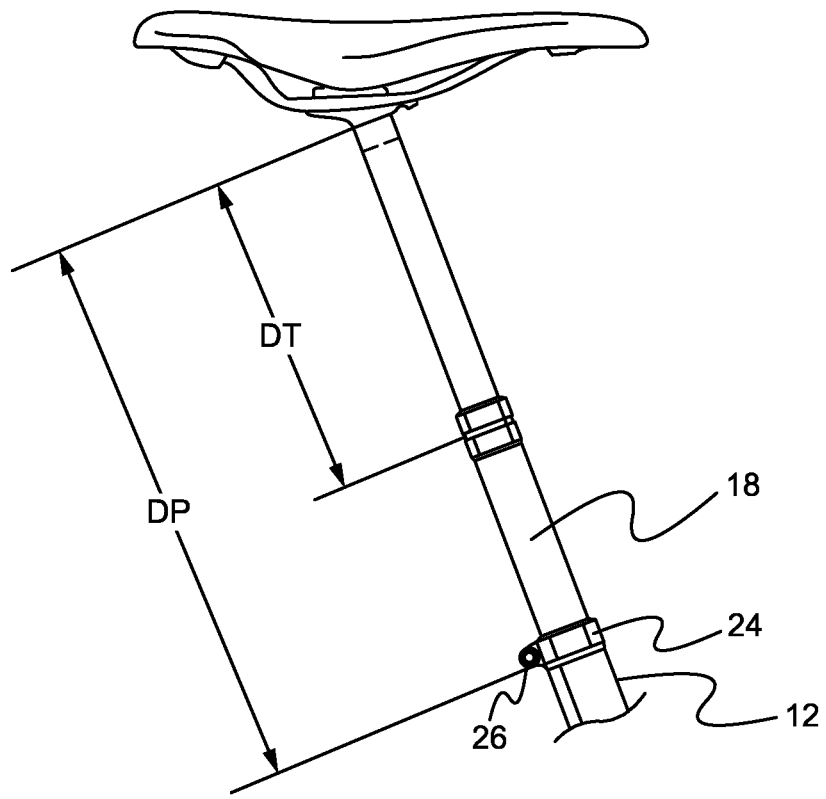
FIG. 2 shows a detail view showing a telescopic seatpost of the complete bicycle assembly, in accordance with some embodiments.

FIG. 2 illustrates a detail view showing the telescopic seatpost 18 of the complete bicycle assembly 10. As shown within FIG. 2, the telescopic seatpost 18 comprises a seatpost clamp 24 and a seatpost clamp screw 26.

Figure 3:
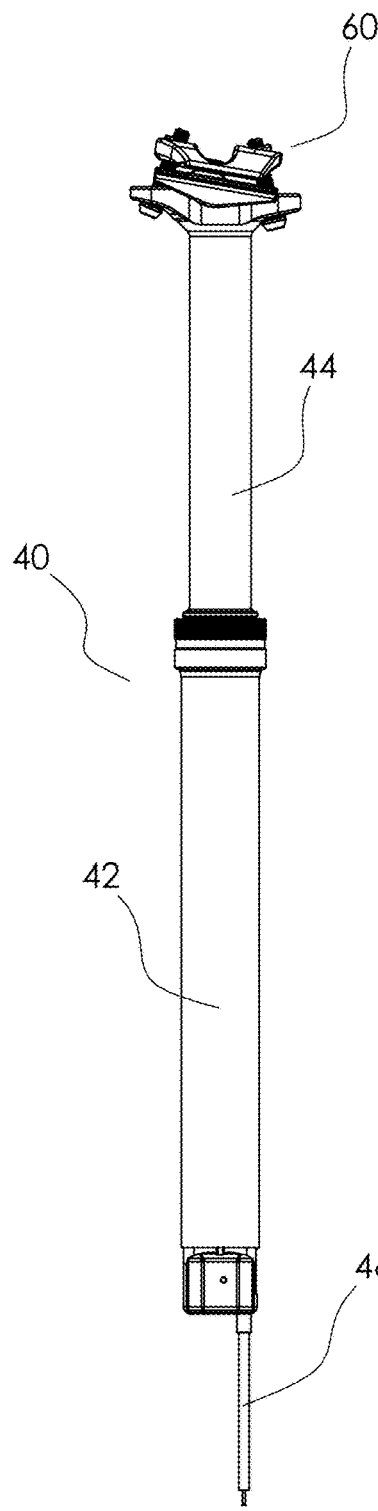
FIG. 3 shows a right side view of a complete seatpost assembly, in a fully extended position, in accordance with some embodiments.

FIG. 3 shows a right side view of a complete seatpost assembly 40, in a fully extended position. The complete seatpost assembly 40 is comprised of an outer tube assembly 42, an inner tube assembly 44, a dummy cable housing assembly 46 coupled to the seatpost, and a saddle clamp assembly 60.

Figure 4:
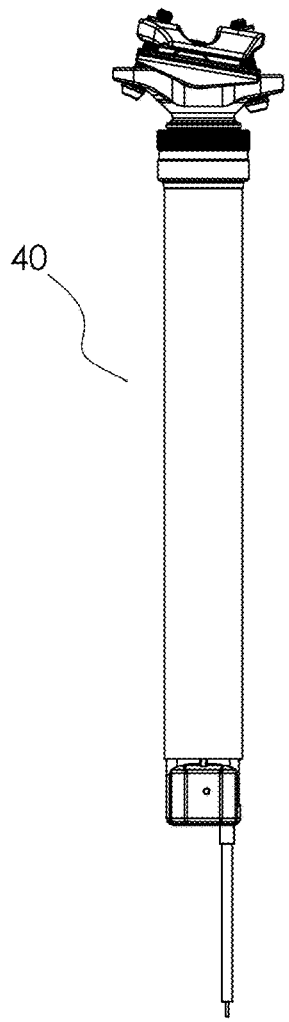
FIG. 4 shows the right side view of a complete seatpost assembly in the fully compressed condition, in accordance with some embodiments.

FIG. 4 shows the right side view of the complete seatpost assembly 40 in the fully compressed condition.

Figure 5:
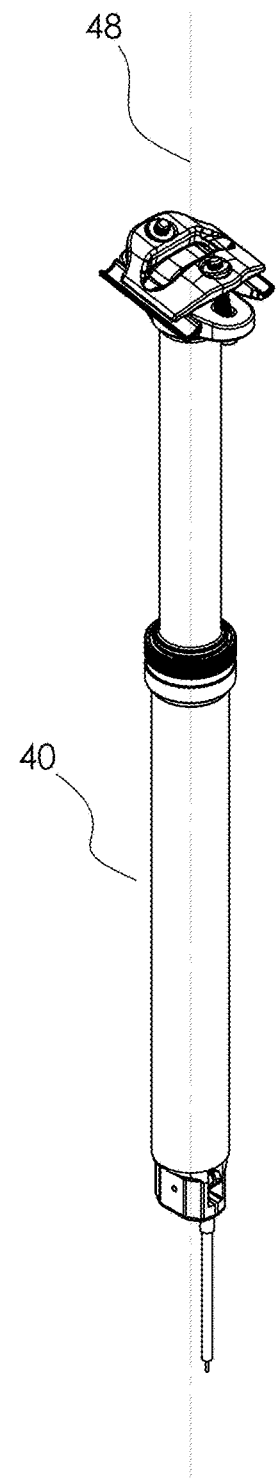
FIG. 5 shows a top-right isometric view of a complete seatpost assembly, and a seatpost long axis, in accordance with some embodiments.

FIG. 5 shows a top-right isometric view of the complete seatpost assembly 40, and a seatpost long axis 48.

Figures 6, 7:
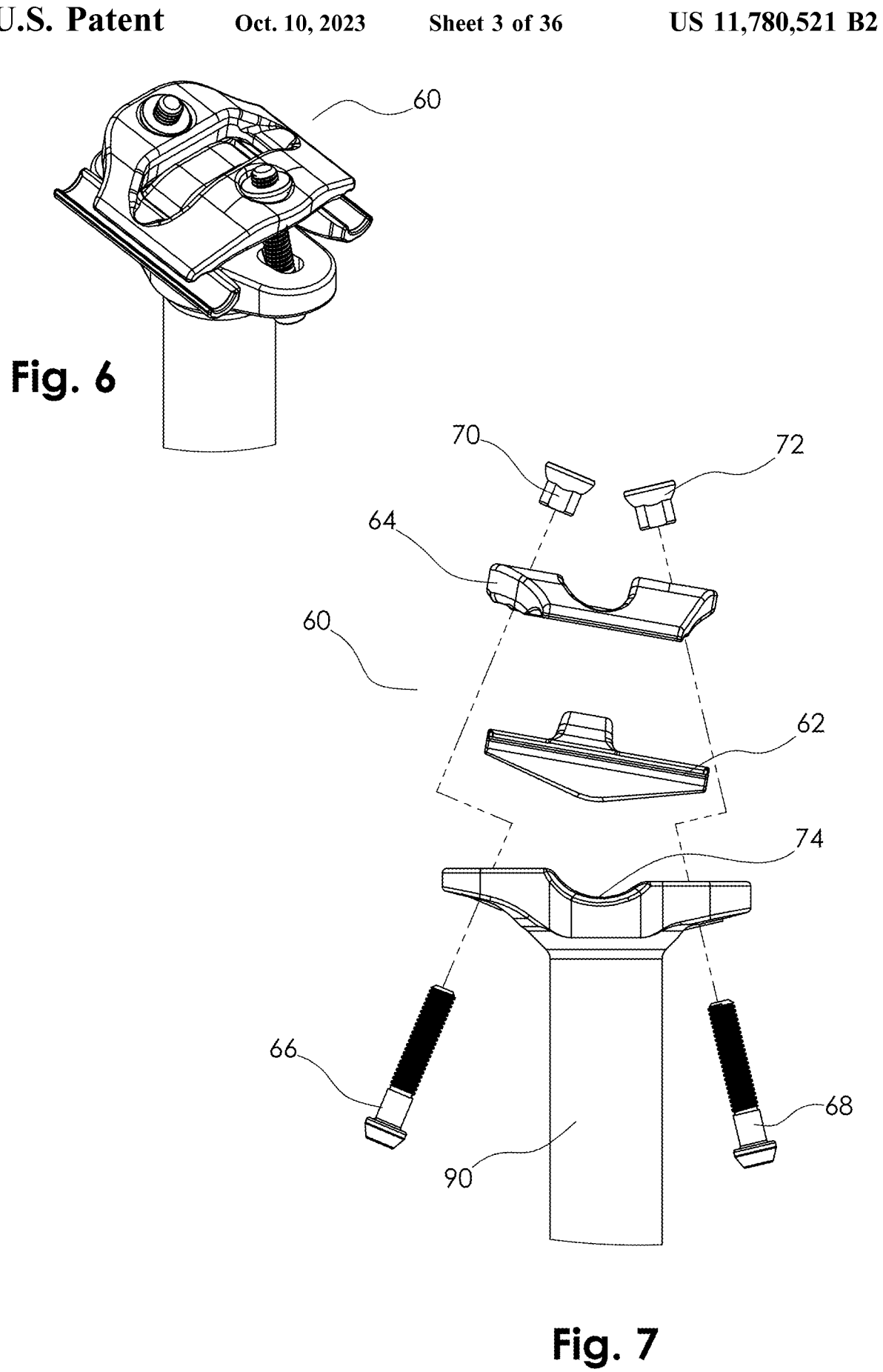
FIG. 6 shows a detail isometric view of a saddle clamp assembly, in accordance with some embodiments.
FIG. 7 shows an exploded right side view of a saddle claim assembly, in accordance with some embodiments.

FIG. 6 shows a detail isometric view of the saddle clamp assembly 60. As shown within FIG. 7, the saddle clamp assembly 60 comprises a saddle rail cradle 62 which rests on a saddle cradle seat 74, part of the seatpost head tube 90, and a saddle rail clamp 64. The assembly is clamped together by a front saddle clamp screw 68 and a front saddle clamp nut 72 in the front, and a rear saddle clamp screw 66 and rear saddle clamp nut 70 in the rear.

Figure 8:
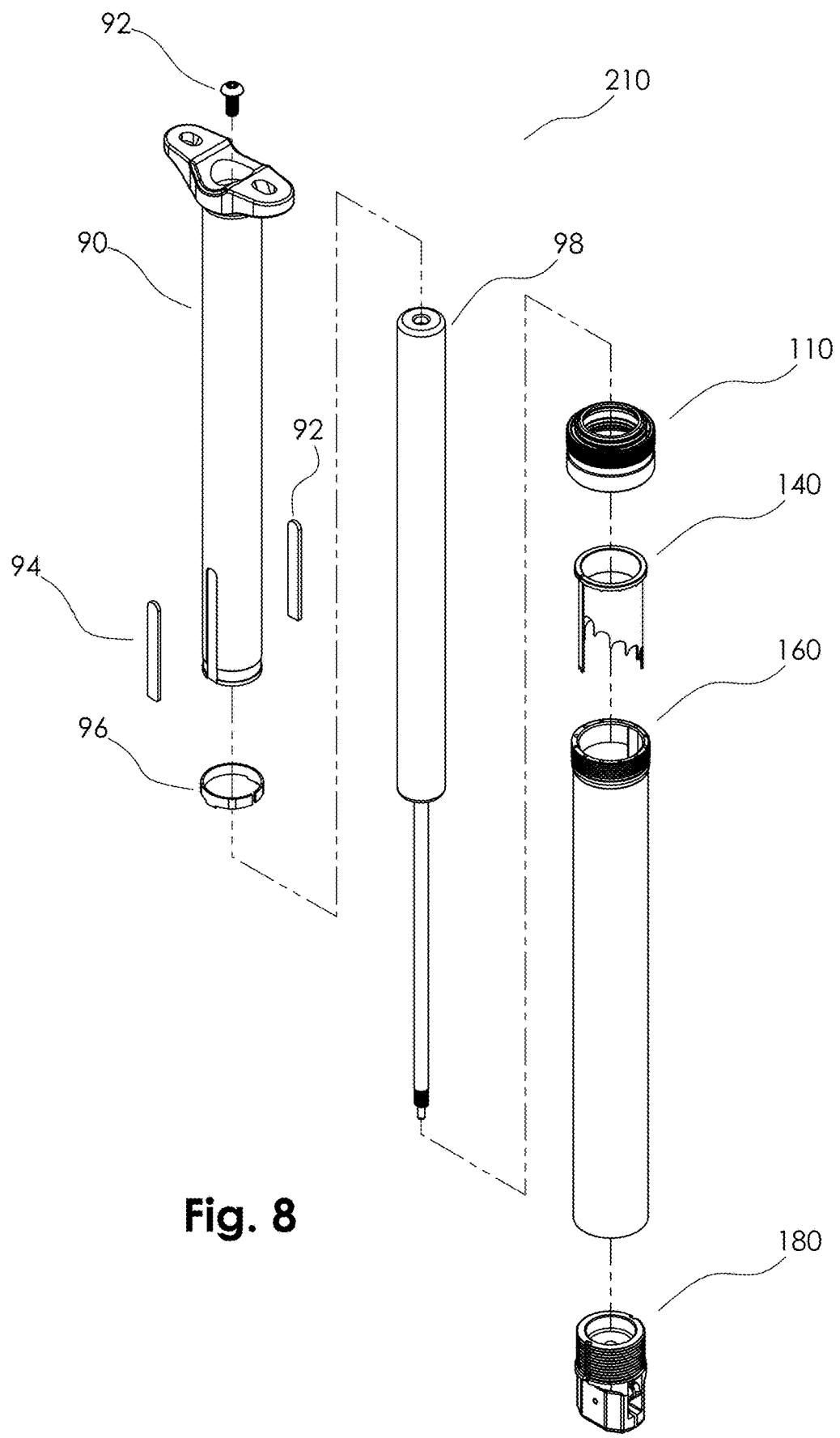
FIG. 8 shows an isometric right-front exploded view of a seatpost base assembly, in accordance with some embodiments.

FIG. 8 shows an isometric right-front exploded view of the seatpost base assembly 210 (the complete seatpost assembly 40 with the saddle clamp assembly 60 removed). From topmost component to bottom, FIG. 8 shows the cartridge top screw 92, then the seatpost head tube 90, around which are arranged the left key 92, right key 94 and bottom bushing 96. When assembled, the cartridge top screw 92 passes through the seatpost head tube 90 and secures the gas spring cartridge 98 to the head tube 90. The lower portion of the seatpost head tube 90 passes through the seal cap assembly 110, on through the stepped bushing 140 and into the outer tube 160. The outer tube 160 is fixed to the bottom cap assembly 180.

FIG. 9 shows a top right isometric view of the inner tube assembly 44, with the left key 92 and bottom bushing 96 installed in their respective operating positions. FIG. 10 shows an exploded view of inner tube assembly 44. The seatpost head tube 90 comprises a saddle cradle seat 74, rear saddle screw slot 76, a front saddle screw slot 78, and a lower bushing annular groove 80. A left key 92 comprises a left key seat surface 260a and the right key 94 comprises a right key seat surface 260b. Also shown within FIG. 9 is the bottom bushing 96.

Figure 11:
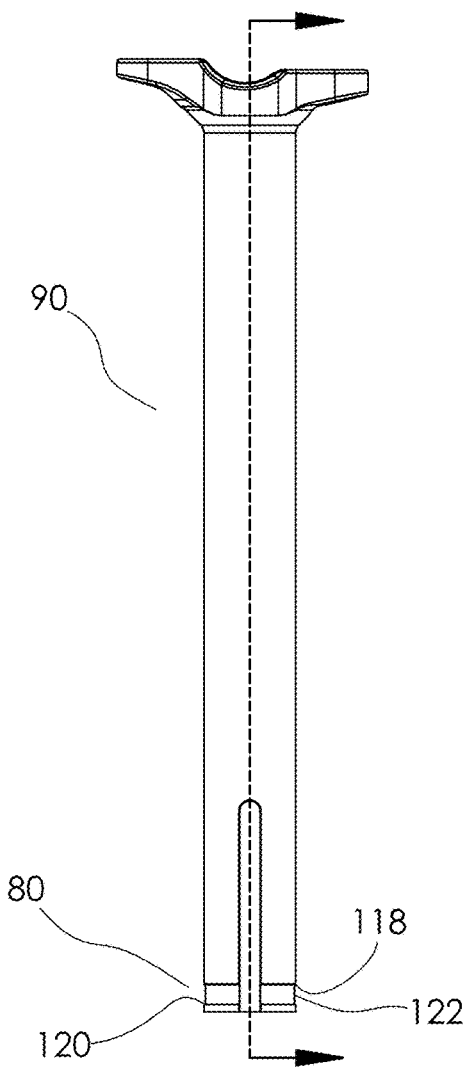
FIG. 11 shows a right view of a seatpost head tube, in accordance with some embodiments.
Figure 12:
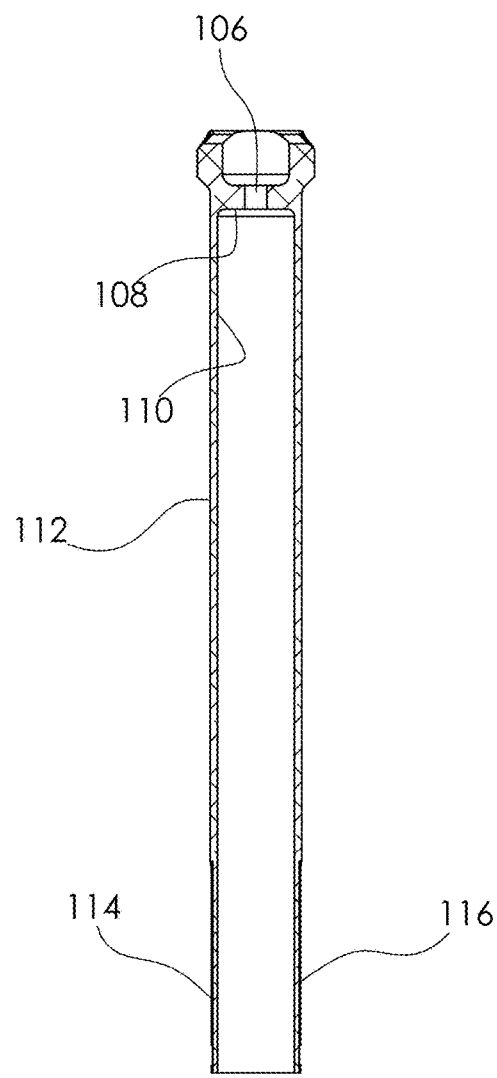
FIG. 12 shows a front section view of a seatpost head tube, in accordance with some embodiments.

FIG. 11 shows a right view of the seatpost head tube 90. Shown at the bottom end of the tube the lower bushing annular groove 80 comprises an annular groove top surface 118, annular groove bottom surface 120, and an annular groove inside surface 122. FIG. 12 illustrates a front section view of the seatpost head tube 90. At the top of the tube is a cartridge top locating hole 106, centered above a cartridge top locating surface 108. Inside the head tube is the head tube inner bore 110, and the outside surface of the tube defines a head tube shaft surface 112. At the bottom of the seatpost head tube 90 are a left key slot 116 and a right key slot 114.

Figure 13:
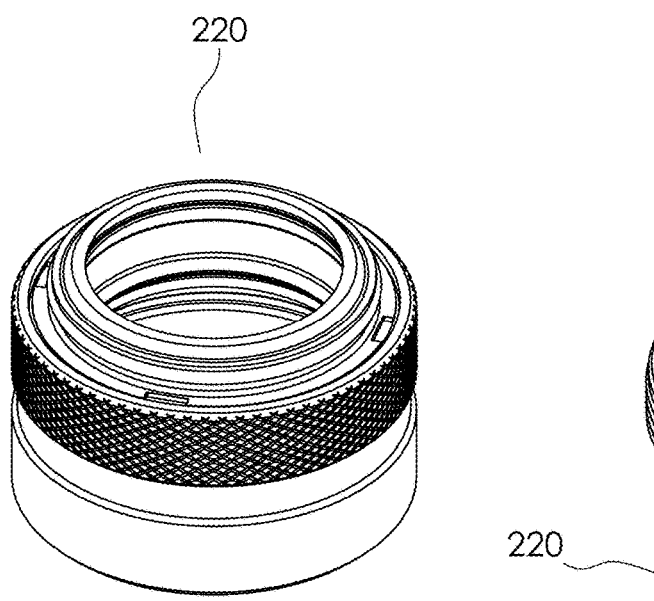
FIG. 13 shows an isometric view of a complete seal cap assembly in the assembled condition, in accordance with some embodiments.
Figure 14:
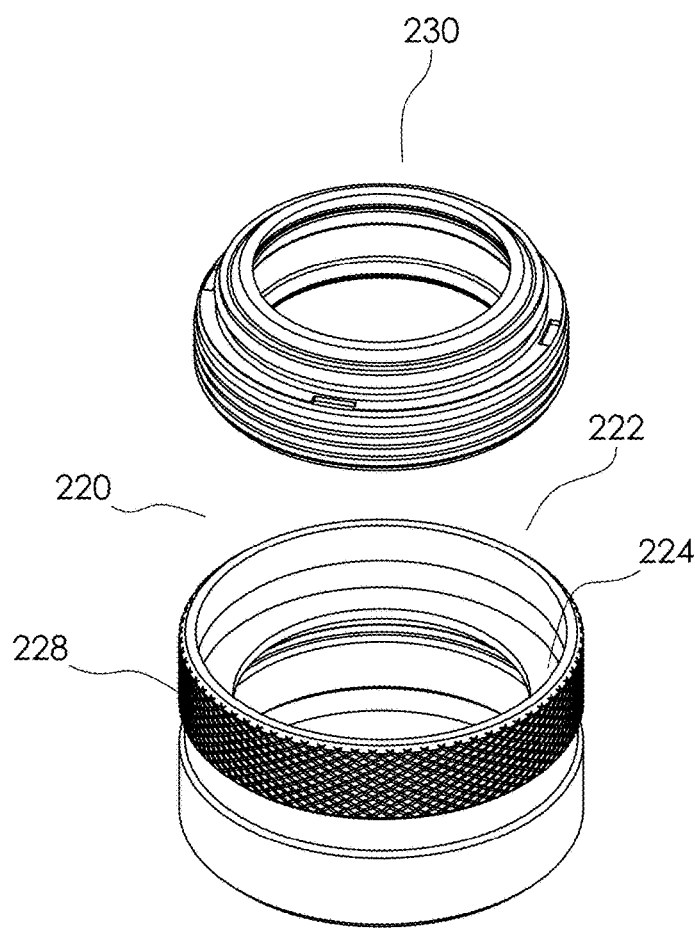
FIG. 14 shows an exploded view of a seal cap assembly, in accordance with some embodiments.
Figure 15:
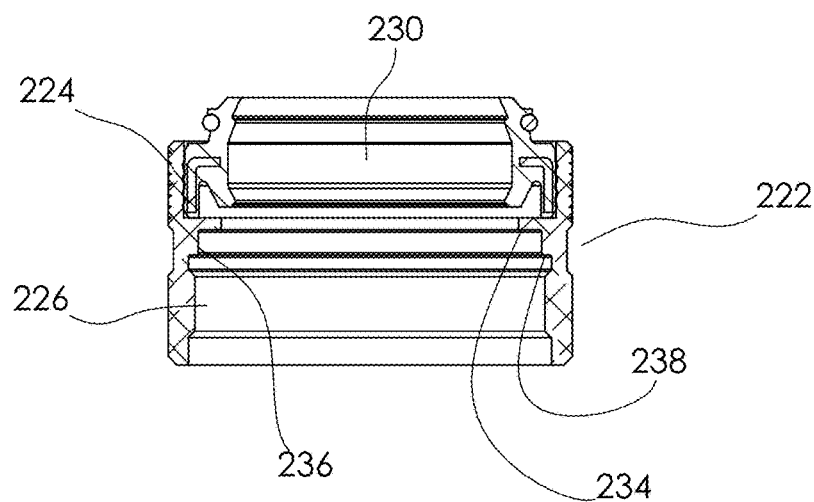
FIG. 15 shows a right section view of a seal cap assembly, in accordance with some embodiments.

FIG. 13 is an isometric view of the complete seal cap assembly 220 in the assembled condition. FIG. 14 shows an exploded view of the seal cap assembly 220, with the retaining ring 222 separated from the shaft seal 230. With the shaft seal 230 removed, the retaining ring seal pocket 224 is visible. The outside diameter of the retaining ring 222 comprises a retaining ring outer knurl 228 to aid assembly and disassembly by hand. As seen in right cross section view FIG. 15, the lower portion of the retaining ring 222 comprises a retaining ring outer tube thread 226, a ring outer tube stop 238, a ring bushing flange stop surface 234 and a ring bushing flange radial pocket 236. As shown within FIG. 15, a shaft seal 230 is shown fitted into the retaining ring seal pocket 224.

Figure 16:
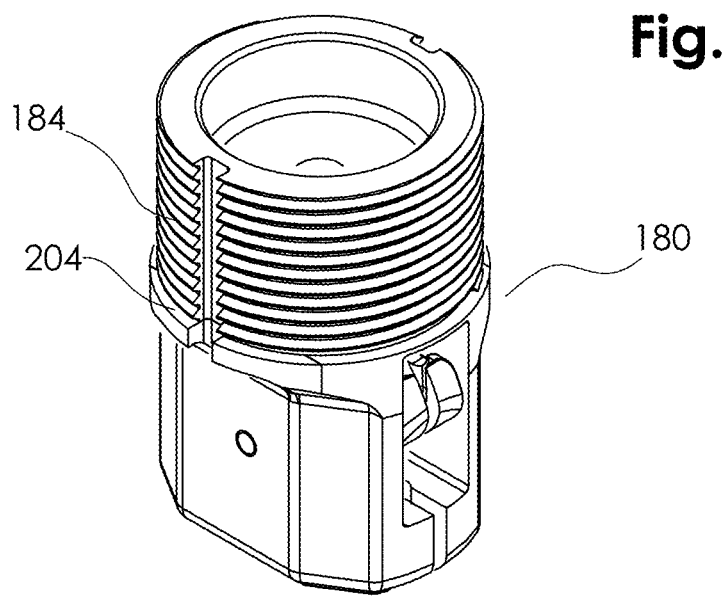
FIG. 16 shows a top front isometric view of a bottom cap assembly, in accordance with some embodiments.
Figure 17:
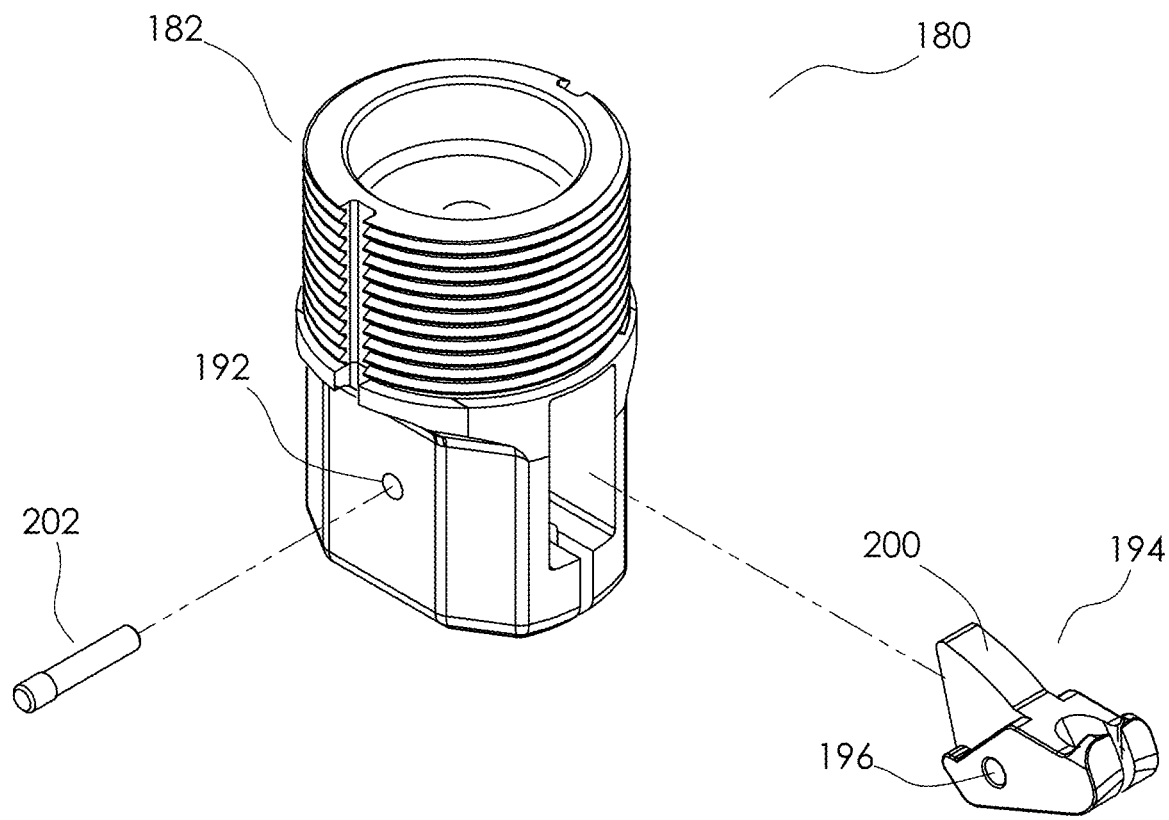
FIG. 17 shows an exploded view of a bottom cap assembly, in accordance with some embodiments.

FIG. 16 shows a top front isometric view of the bottom cap assembly 180, including a bottom cap body 182, the bottom cap outer thread 184 and a cap outer thread stop surface 204. FIG. 17 shows an exploded view of the bottom cap assembly 180, including a cartridge actuation cam 194, which comprises a cam pivot pin hole 196, and a cam actuation surface 200. As also shown within FIG. 17, is a cam pivot pin 202, which passes through a bottom cap pivot pin hole 192 and the cam pivot pin hole 196.

Figure 18:
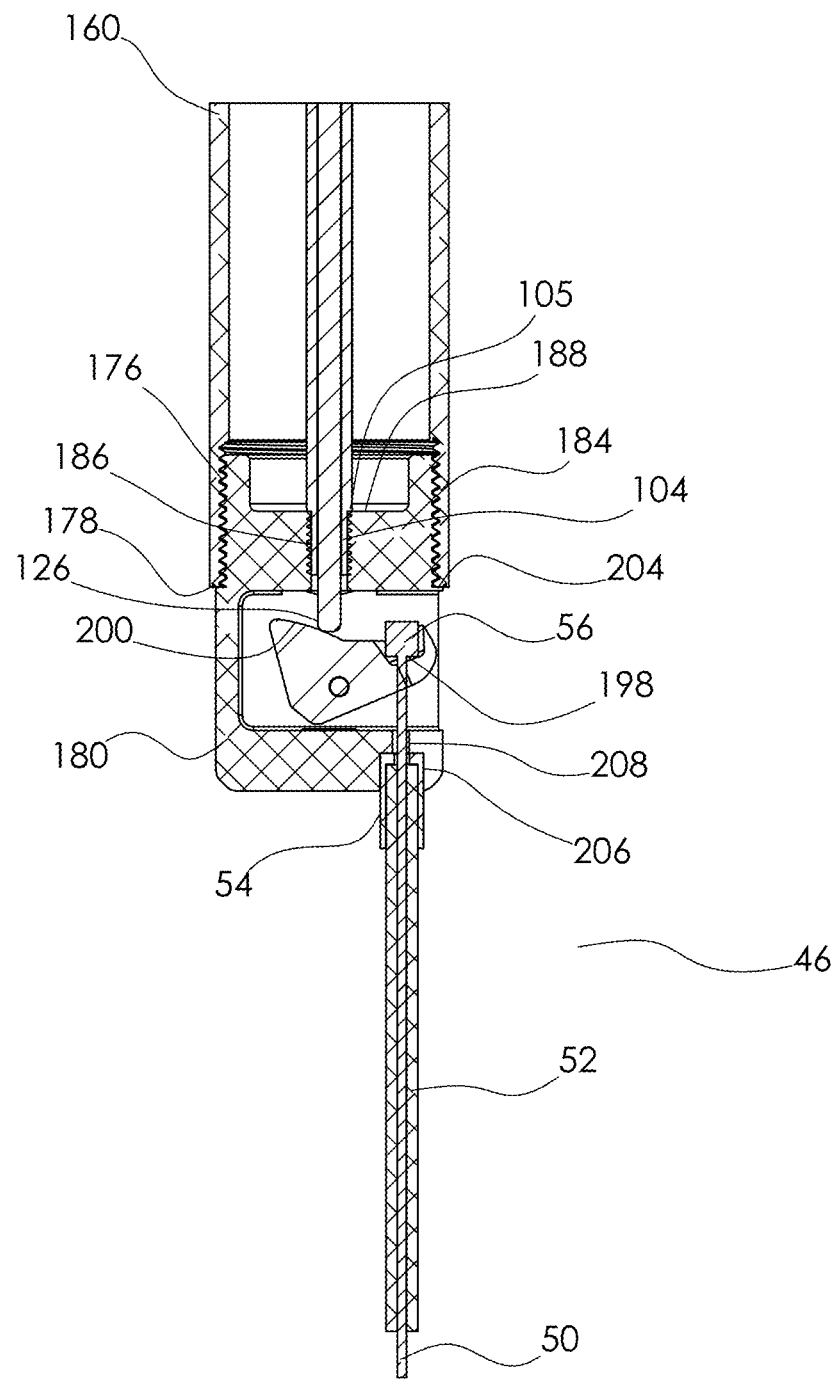
FIG. 18 shows a partial cross section view of a bottom cap assembly installed in the outer tube, in accordance with some embodiments.

FIG. 18 is a partial cross section view of the bottom cap assembly 180 installed in the outer tube 160. The bottom cap outer thread 184 is threaded into an outer tube bottom inside thread 176 such that the cap outer thread stop surface 204 contacts the outer tube bottom surface 178. The dummy cable housing assembly 46 is shown in section, and includes a cable housing 52, cable ferrule 54 and a actuation cable 50 comprising a cable lug 56. The cable ferrule 54 is seated in the bottom cap cable stop hole 206, and the actuation cable 50 passes through the bottom cap cable through hole 208. The cable lug 56 is fitted in a cam cable seat 198, and an unlock shaft radiused end 126 contacts a cam actuation surface 200. A cartridge shaft thread 104 is threaded into a bottom cap inner threaded hole 186, until a cartridge shaft stop surface 105 contacts a bottom cap gas cartridge stop surface 188.

FIG. 19 shows a top view of the outer tube 160, and includes 12 outer tube locating detents 168a through 168l, a left keyway 164 and a right keyway 166, and an outer tube inner bore 174. FIG. 20 shows a right rear isometric view of the outer tube 160. FIG. 21 shows a detail right rear isometric view of the outer tube 160, and shows the outer tube upper thread 162, the left keyway 164, an outer tube top surface 170 and the outer tube locating detent 168a, and outer tube outer diameter 172.

Figure 22:
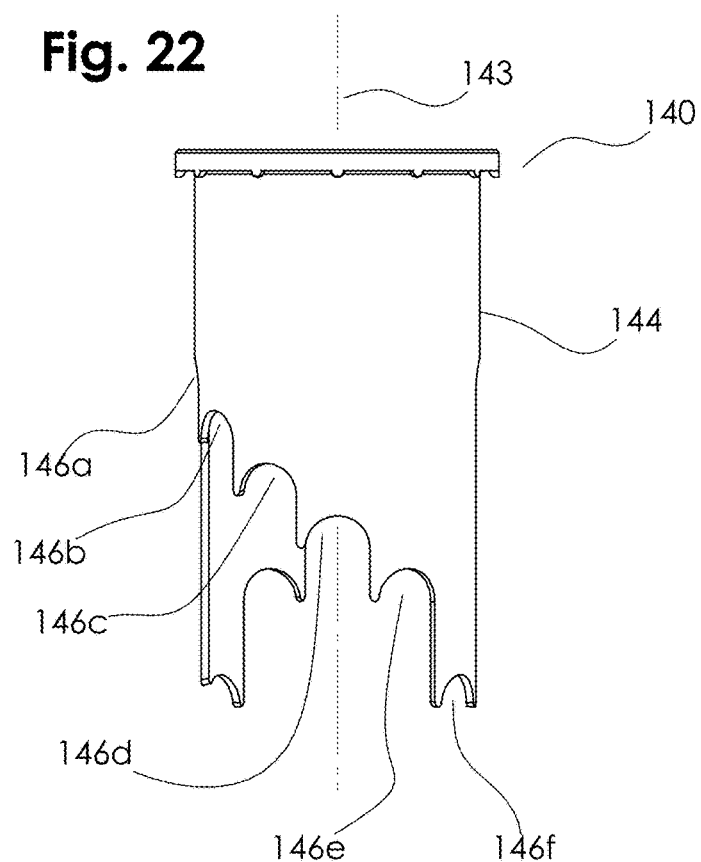
FIG. 22 shows a right view of a stepped bushing, in accordance with some embodiments.
Figure 23:
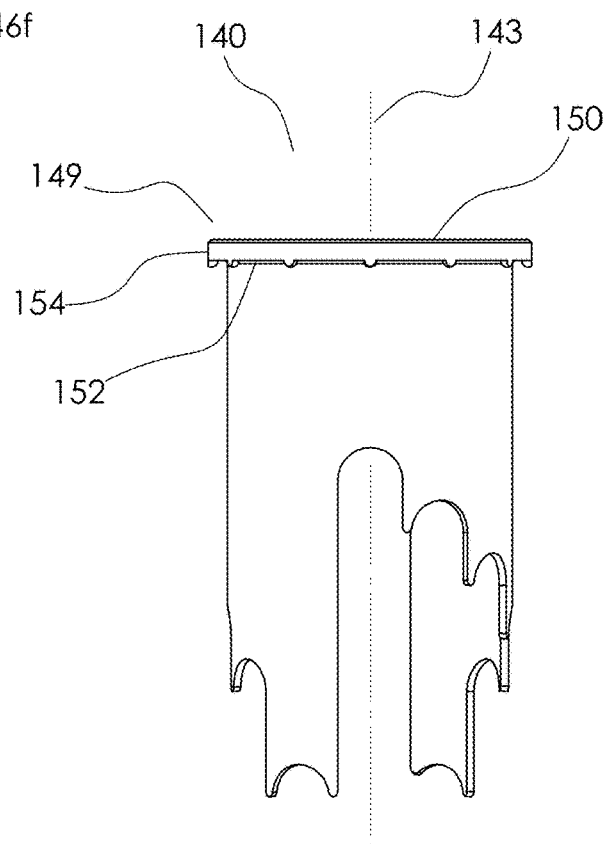
FIG. 23 shows a front view of a stepped bushing, in accordance with some embodiments.

FIG. 22 shows a right view of the stepped bushing 140, including a stepped bushing outside diameter 144, and stepped bushing seats first series 146a-f. FIG. 22 also shows stepped bushing center axis 143. FIG. 23 shows a front view of the stepped bushing 140, including a stepped bushing flange 149, comprised of a bushing flange top surface 150, bushing flange bottom surface 152, and bushing flange outside diameter 154, and a stepped bushing center axis 143.

Figure 24:
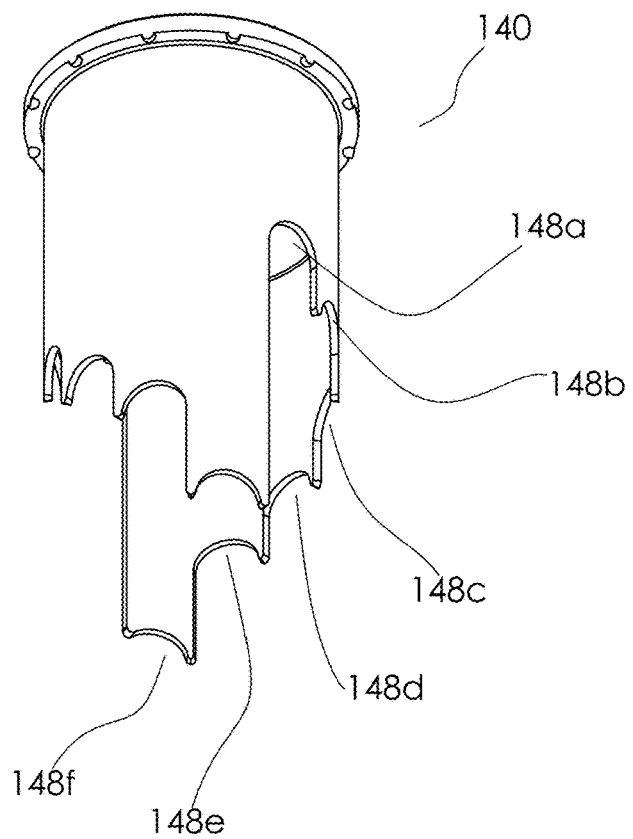
FIG. 24 shows a bottom right isometric view of a stepped bushing, in accordance with some embodiments.
Figure 25:
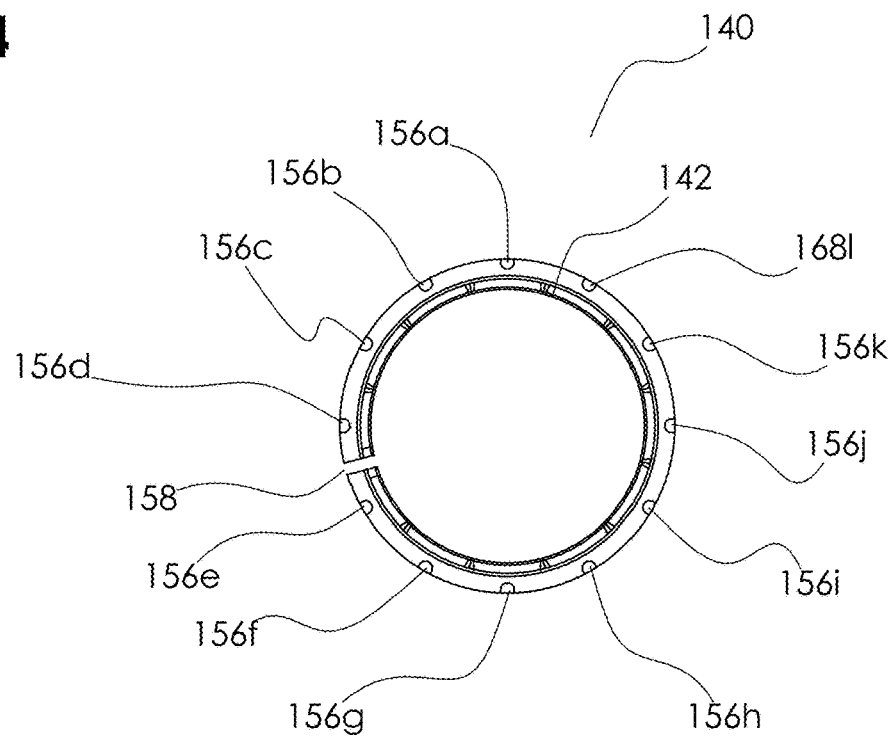
FIG. 25 shows a bottom view of a stepped bushing, in accordance with some embodiments.

FIG. 24 is a bottom right isometric view of the stepped bushing 140, showing the stepped bushing seats second series 148a-f. FIG. 25 shows a bottom view of the stepped bushing 140, including stepped bushing slot 158, bushing locating protrusions 156a through 156l, and stepped bushing inner bore 142.

Figure 26:
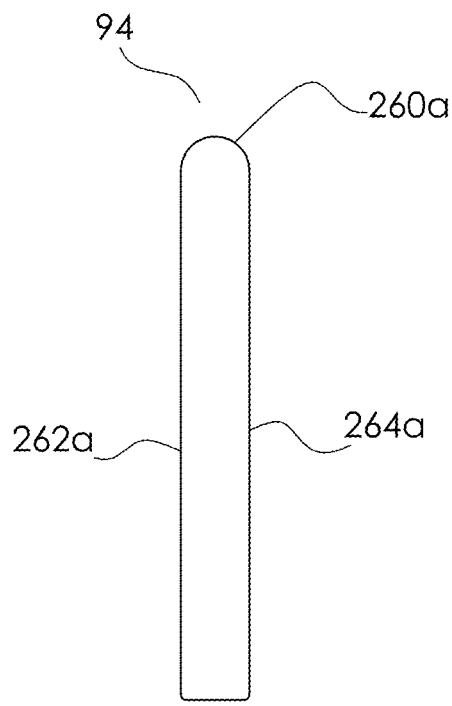
FIG. 26 shows a front view of a right key, in accordance with some embodiments.
Figure 27:
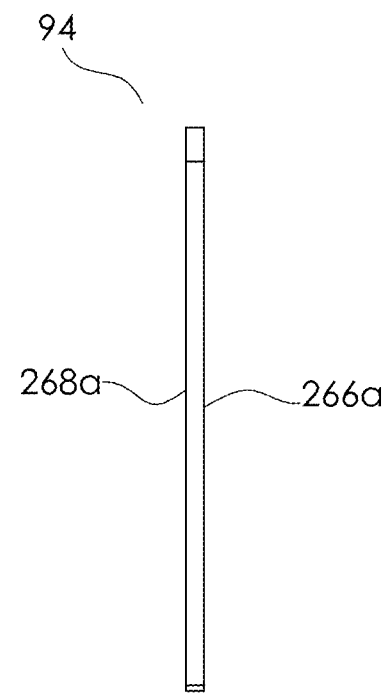
FIG. 27 shows a right side view of a right key, in accordance with some embodiments.
Figure 28:
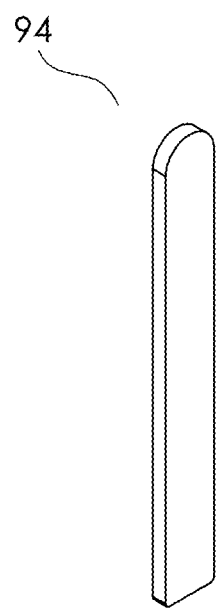
FIG. 28 shows a front right isometric view of a right key, in accordance with some embodiments.

FIG. 26 shows a front view of the right key 94. In some embodiments, the right key 94 and the left key 92 are identical in design. As shown with FIG. 26, the right key 94 comprises a right key left edge 262a, a right key right edge 264a, and a right key seat surface 260a. FIG. 27 shows a right side view of the right key 94, a right key outer face 266a and a right key inner face 268a. FIG. 28 shows a front right isometric view of the right key 94.

FIG. 29 shows a front view of the seatpost base assembly 210. FIG. 30 shows a right section view of the seatpost base assembly 210, including the stepped bushing 140.

Figure 31:
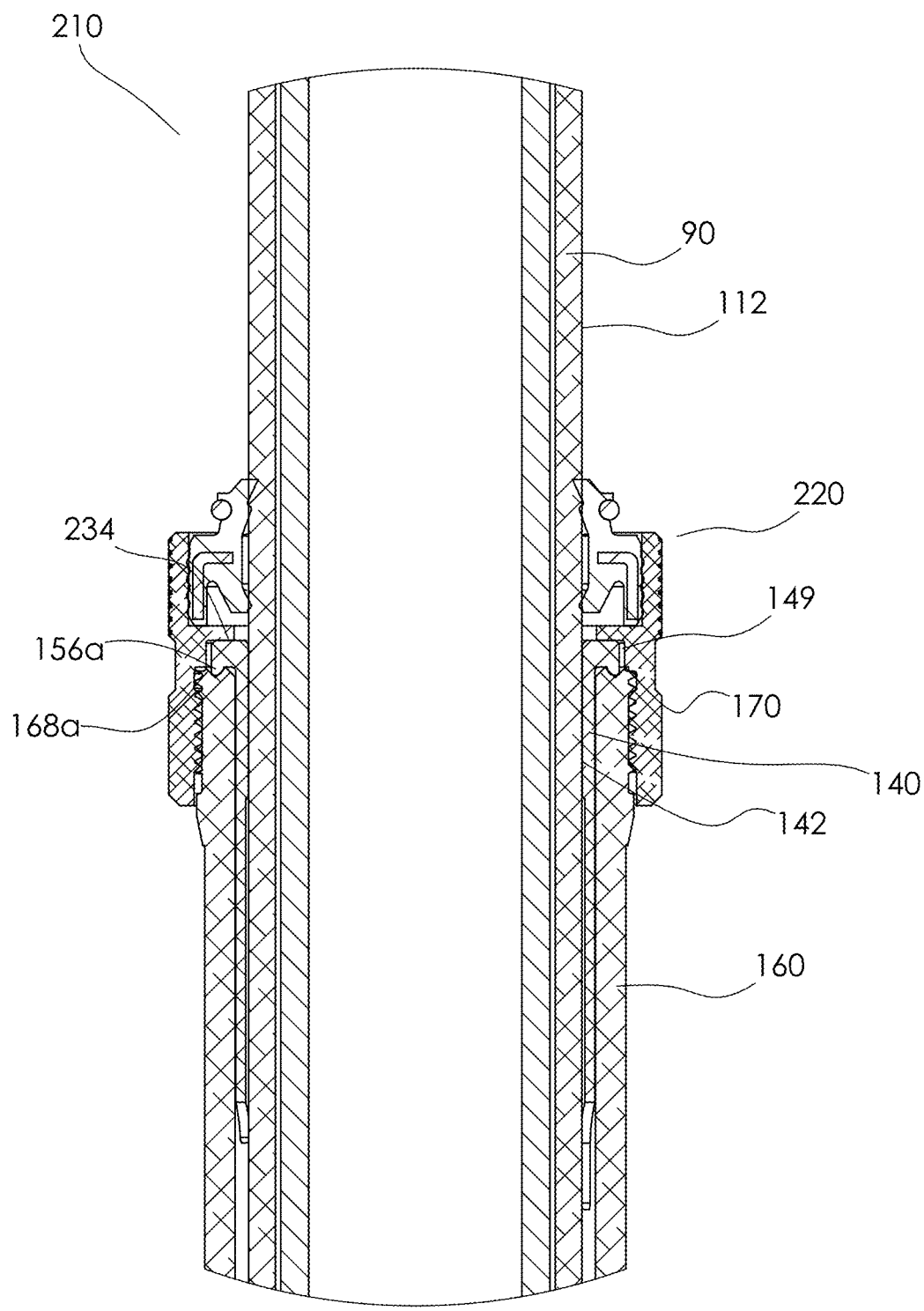
FIG. 31 shows a right detail section view of a seatpost base assembly, in accordance with some embodiments.

FIG. 31 is a right detail section view of the seatpost base assembly 210, showing the seal cap assembly 220 assembled together with stepped bushing 140 and outer tube 160. The head tube 90 passes through the seal cap assembly 220, and the head tube shaft surface 112 is supported by and moves inside the stepped bushing inner bore 142. The stepped bushing flange 149 is constrained between the ring bushing flange stop surface 234 and the outer tube top surface 170. The bushing locating protrusion 156a is shown settled into the outer tube locating detent 168a.

Figure 32:
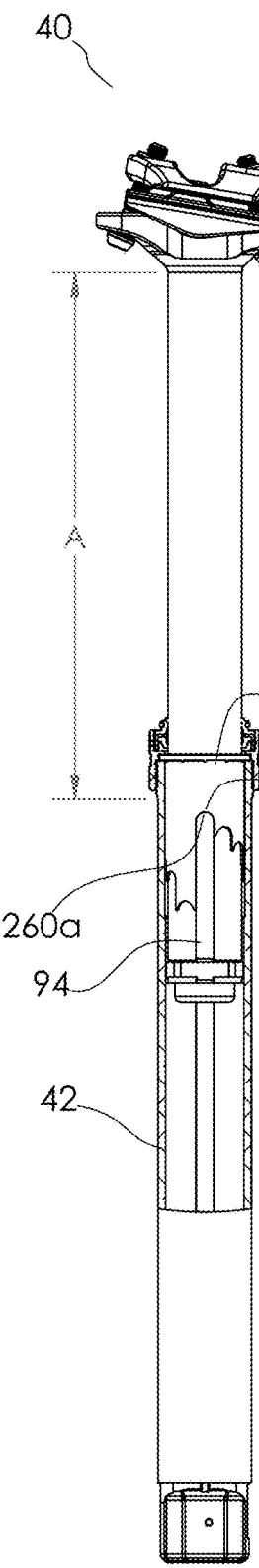
FIG. 32 shows a right side partial section view of a complete seatpost assembly, in accordance with some embodiments.
Figure 33:
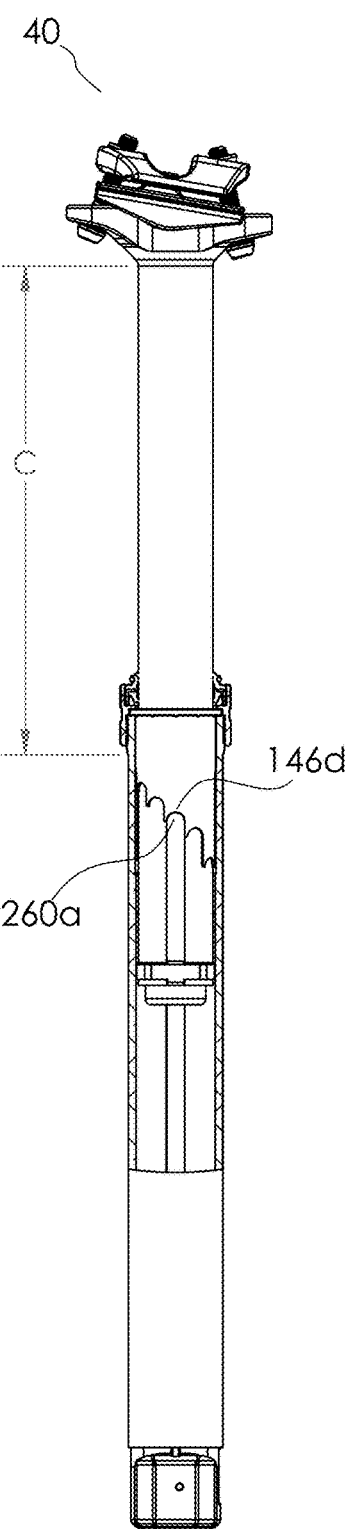
FIG. 33 shows a complete seatpost assembly configured for an intermediate resting height C, in accordance with some embodiments.
Figure 34:
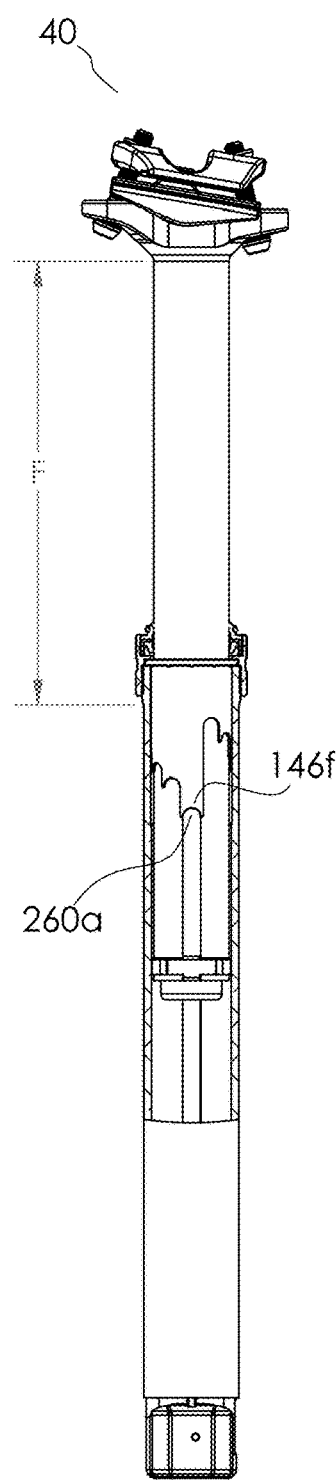
FIG. 34 shows a complete seatpost assembly configured for a minimum resting height F, in accordance with some embodiments.

FIG. 32 is a right side partial section view of the complete seatpost assembly 40, with the outer tube 42 cut away to reveal the stepped bushing 140 and the right key 94. FIG. 32 shows the complete seatpost assembly 40 configured for maximum resting height A, with the right key seat surface 260a contacting the stepped bushing seat first series 146a. FIG. 33 is a right side partial section view of the complete seatpost assembly 40. FIG. 33 shows the complete seatpost assembly 40 configured for an intermediate resting height C, with the right key seat surface 260a contacting the stepped bushing seat first series 146d. FIG. 34 is a right side partial section view of the complete seatpost assembly 40. FIG. 34 shows the complete seatpost assembly 40 configured for a minimum resting height F, with the right key seat surface 260a contacting the stepped bushing seat first series 146f.

Figures 35, 36:
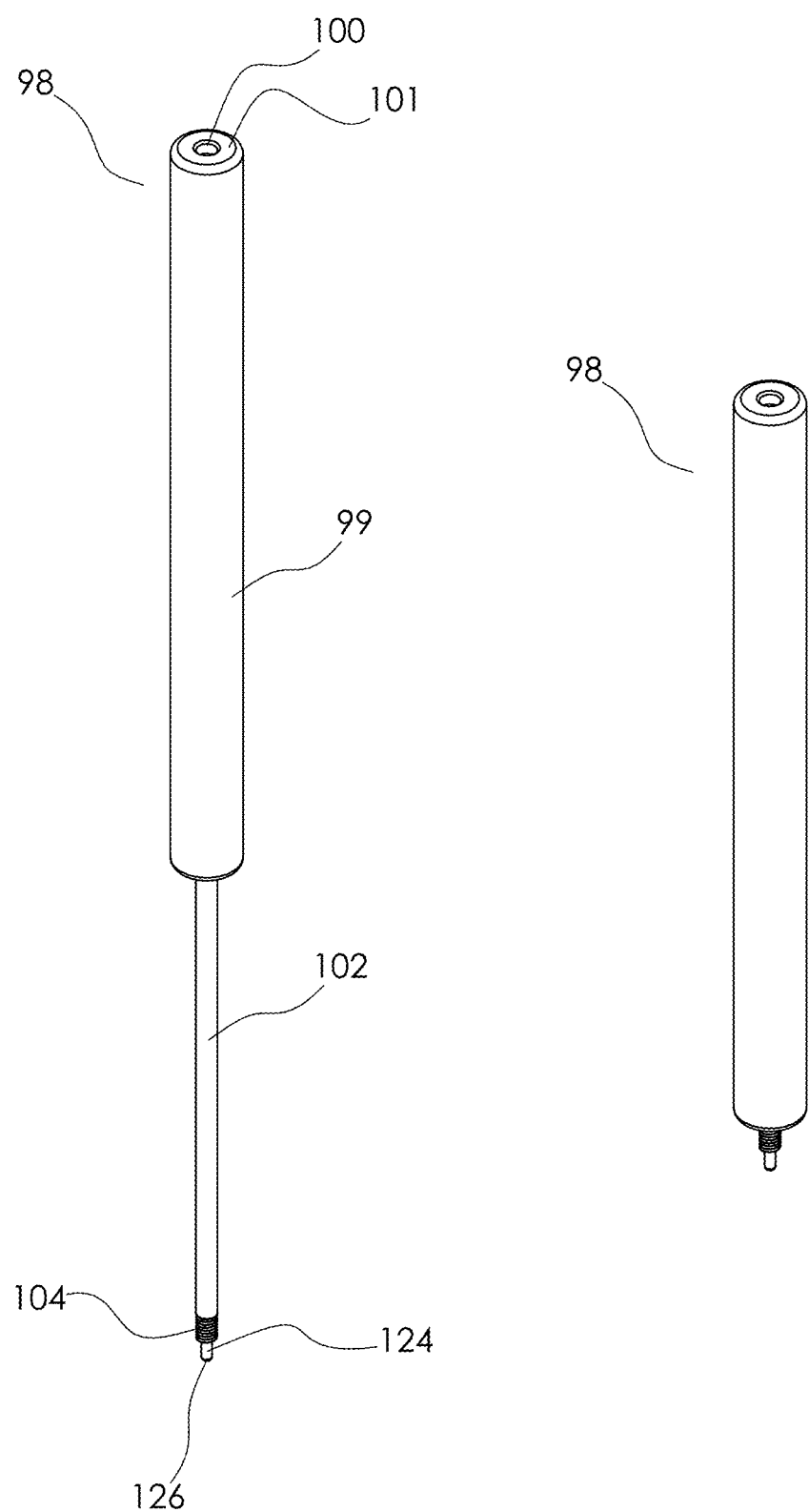
FIG. 35 shows a front right isometric view of a gas spring cartridge in the fully extended condition, in accordance with some embodiments.
FIG. 36 shows a front isometric view of a gas spring cartridge in the fully compressed condition, in accordance with some embodiments.

FIG. 35 is a front right isometric view of the gas spring cartridge 98 in the fully extended condition, showing a gas spring cartridge body 99, a cartridge top screw hole 100 and a cartridge top end surface 101. Extending out from the bottom of the gas spring cartridge 98 is a movable cartridge shaft 102, which comprises a cartridge shaft thread 104. Extending slidably through and protruding from the end of the cartridge shaft 102 are a cartridge unlock shaft 124, which includes an unlock shaft radiused end 126. FIG. 36 shows a front isometric view of the gas spring cartridge 98 in the fully compressed condition.

Figure 37:
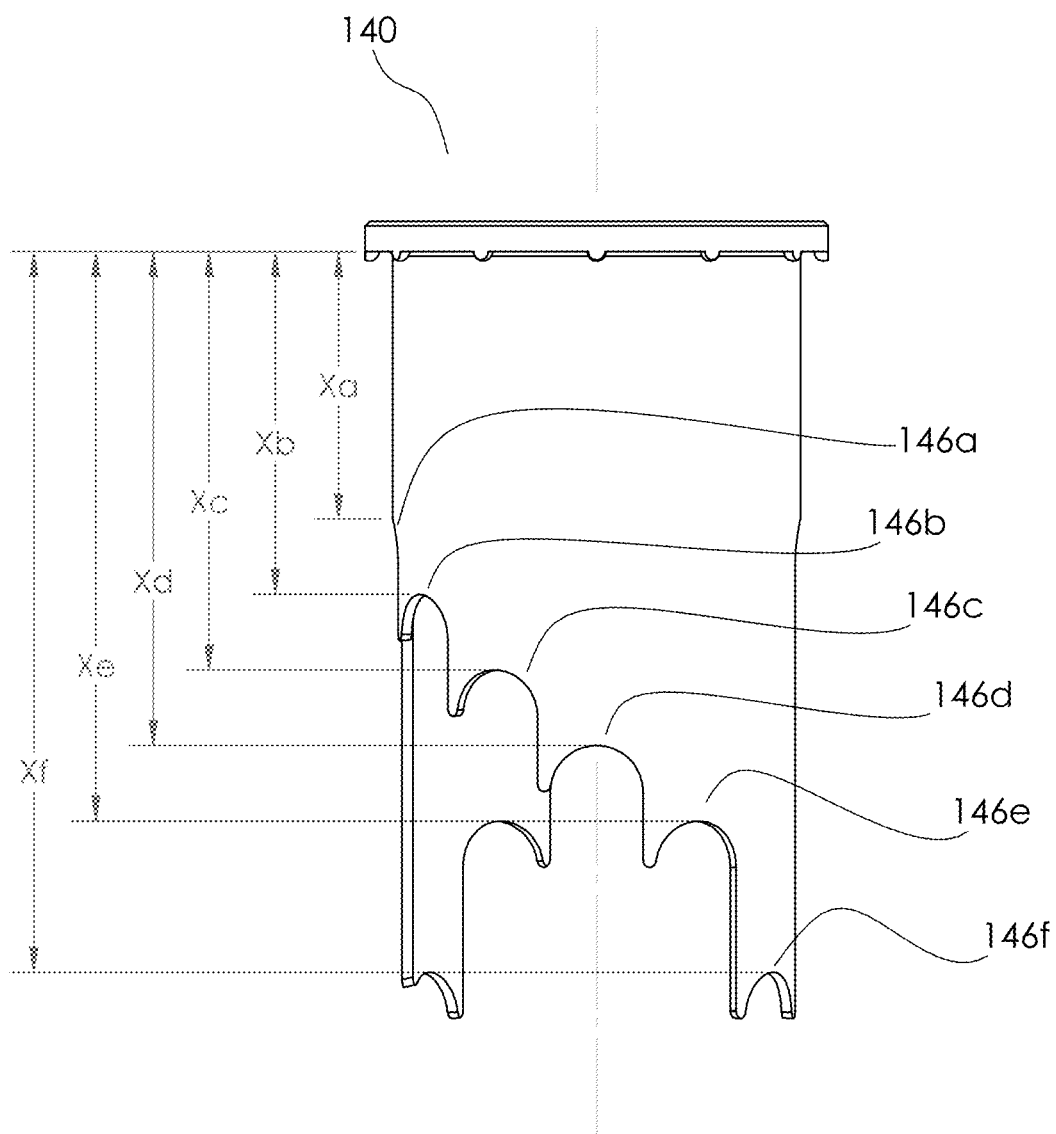
FIG. 37 shows a right view of a stepped bushing, in accordance with some embodiments.

FIG. 37 shows a right view of stepped bushing 140, specifying the step distances Xa through Xf corresponding to stepped bushing seat first series 146a through 146f.

FIG. 38 shows a bottom isometric view of a stepped bushing 280. The bushing 280 employs an array of locating protrusions 282 in the shape of triangular wedges.

FIG. 39 is a top isometric view of an outer tube 286 in accordance with further embodiments. This outer tube 286 receives a locating protrusion 282 in a first locating groove 284. FIG. 40 is a top isometric view of a stepped bushing 280 assembled with an outer tube 286.

FIG. 41 shows a bottom isometric view of a stepped bushing 290 in accordance with further embodiments. The stepped bushing 290 employs an array of locating protrusions 292 comprising tabs cut from the bushing flange. FIG. 42 is a top isometric view of an outer tube 296. The outer tube receives the locating protrusion 292 in an array of locating slots 294. FIG. 43 is a top isometric view of the stepped bushing 290 assembled with the outer tube 296.

Figure 44:
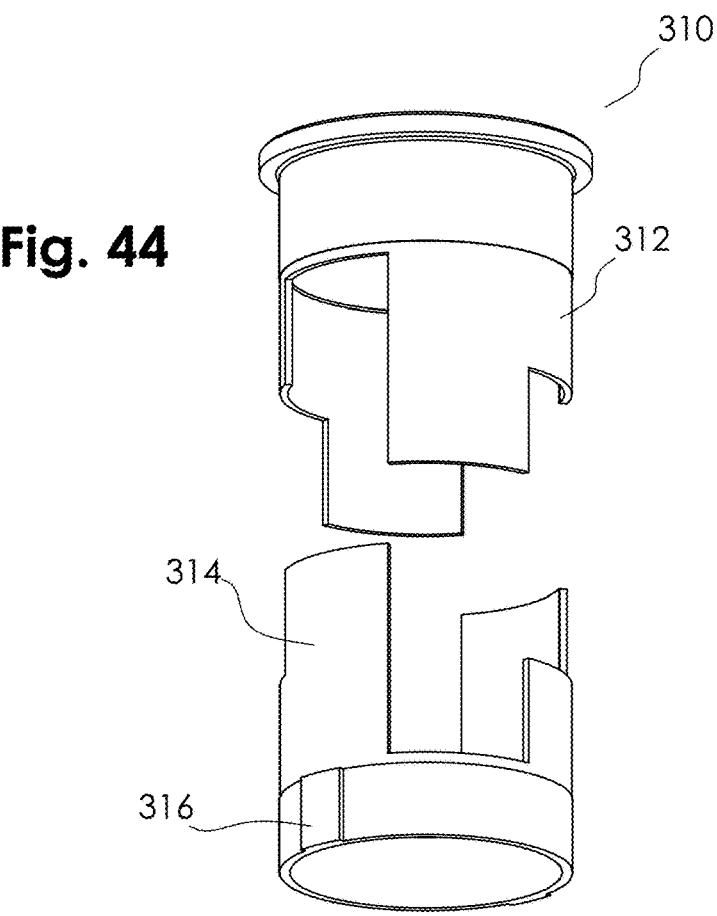
FIG. 44 shows a bottom isometric exploded view of a stepped bushing assembly, in accordance with further embodiments.
Figure 45:
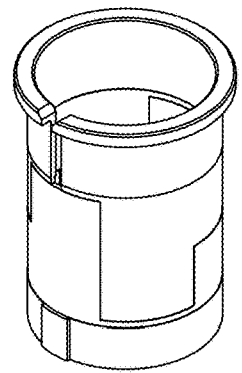
FIG. 45 shows an isometric view of a stepped bushing assembly 310 configured in the lowest height setting.
Figure 46:
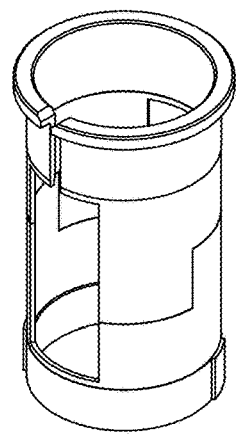
FIG. 46 shows an isometric view of a stepped bushing assembly, in accordance with some embodiments.
Figure 47:
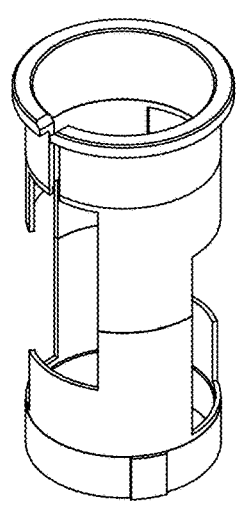
FIG. 47 shows an isometric view of a stepped bushing assembly, in accordance with some head assembly of the seatpost

FIG. 44 is a bottom isometric exploded view of a stepped bushing assembly 310 in accordance with further embodiments. The stepped bushing assembly comprises two pieces, an upper stepped bushing 312, and a lower stepped bushing 314. The lower stepped bushing comprises a lower stepped bushing keyway boss 316. FIG. 45 is an isometric view of the stepped bushing assembly 310 configured in the lowest height setting. FIG. 46 is an isometric view of the stepped bushing assembly 310 configured in a middle height setting. FIG. 47 is an isometric view of the stepped bushing assembly 310 configured in the highest height setting.

In some embodiments, to assemble the telescopic bicycle seatpost, the complete bicycle seatpost assembly 40 is slid into a bicycle seat tube 12, such as described above and an actuation cable is attached to the bottom of the seatpost. The actuation cable is attached to the bottom of the seatpost in lieu of the dummy cable housing assembly 46 and operates an actuation cable in the same manner as the actuation cable 50, such as described above.

A gas spring cartridge, such as the gas spring cartridge 98 acts as a spring between the cartridge shaft stop surface 105 and the cartridge top locating surface 108. The cartridge shaft 102 is normally locked in place until the cartridge unlock shaft 124 is depressed into the cartridge shaft 102 at which time the gas spring cartridge 98 may be compressed as the cartridge shaft 102 slides into the gas spring cartridge body.

To operate the seatpost and lower the bicycle saddle 16 while riding the bicycle, a rider applies tension to the actuation cable 50 using a lever button or other appropriately desired mechanism. The cable lug 50 applies downward pressure on the cam cable seat 198 of the cartridge actuation can 194 and rotates it about the cam pivot pin 202. Then, the cam actuation surface 200 presses against the unlock shaft radiused end 125 moving the cartridge unlock shaft 124 upward through the cartridge shaft 102 allowing the gas spring cartridge 98 to compress.j9 Once the gas spring cartridge 98 is unlocked, the rider applies body weight to the bicycle saddle 16, which causes the complete seatpost assembly 40 to reduce in length. The seatpost assembly 40 is able to telescope to a fully compressed, such as shown within FIG. 4, or to an intermediate length chose by the rider. Releasing tension on the actuation cable 50 enables the cartridge unlock shaft 124 to release, locking the gas spring cartridge 98 in place and locking the bicycle saddle 16 in a new, lower position.

To return the bicycle saddle to a top resting height, protrusion height DP, the rider removes their weight from the bicycle saddle 16 and activates the actuation cable 50. On activation of the cable 50, the gas spring cartridge 98 extends to its full length or other length as determined by the rider.

Based on the height and leg length of the rider and the distance from the top of the bicycle seat tube 12 to the bicycle crank assembly 20, a preferred seatpost protrusion height DP may be calculated such that the saddle 16 is positioned properly for the rider when the seatpost is at full extension. Once the seatpost position DP is known, the telescoping height DT may be adjusted using the step bushing 140 such that the telescoping height DT may be maximized for the seatpost protrusion height DP.

In operation, the telescoping height DT of the complete seatpost assembly 40 is controlled by the left key 92, the right key 94 and the stepped bushing 140. In some embodiments, the stepped bushing 140 may be clocked about the stepped bushing center axis 143 into one of six positions as determined by the relationship between the outer tube locating detents 168a through 168l and the bushing locating protrusions 156a through 156l. In some embodiments, the stepped bushing seats first series 146a through 146f correspond in height to the stepped bushing seats second series 148a through 148f, such that the stepped bushing seat first series 146a matches the height of the stepped bushing seat second series 148a, only rotated 180 degrees around the stepped bushing axis 143.

To adjust the telescoping height DT, the first seal cap assembly 220 is unthreaded from the outer tube upper thread 162 and slid upward on the head tube shaft surface 112. Once the seal cap assembly 220 is out of the way, the actuation cable 50 may be activated so that the gas spring cartridge 98 extends to its full length and forces the stepped bushing 140 to extend out from the top of the outer tube 160.

At this point, the stepped bushing 140 is accessible above the outer tube 160 and may be slid up the head tube shaft surface 112 to free the bushing location protrusions 156a through 156l from the outer tube locating detents 168a through 168*l*. Once the protrusions are free, the stepped bushing 140 may be rotated to align the bushing locating protrusions 156*a* through 156*l* with the outer tube locating detent 168*a* to align the stepped bushing first series 146*a* through 146*f* with the left keyway 164 and the left key 92 depending on a preferred telescoping height DT.

In some embodiments, there are six telescoping heights DT and the total internal height adjustment fo the seatpost is determined by the step distances Xa through Xf.

Once a step distance is chosen, the actuation cable 50 is activated and the gas spring cartridge 98 is compressed by pushing down on the bicycle saddle 16 such that the left key 92 and the right key 94 are moved down into the outer tube 160 to make room for the stepped bushing 140 to be reinserted. Then, the stepped bushing seat first series 146*a* through 146*f* is aligned with the left key 92 and the stepped bushing 140 is slid back down the outer tube 160 until the stepped bushing flange bottom surface 152 contacts the outer tube top surface 170 and the bushing locating protrusions 156*a* through 156*l* are seated in the outer tube locating detents 168*a* through 168*l*. Now, the seal cap 220 may be slid back down the head tube shaft surface 112 and threaded back onto the outer tube upper thread 162.

In some embodiments, a stepped bushing 280 and an outer tube 286 are able to be used. As shown within FIGS. 38-40, an array of triangular shaped locating protrusions are used. The array of locating protrusions 282 fit into an array of triangular shaped locating grooves to manage the clocking between the stepped bushing and outer tube 286.

In further embodiments, such as shown within FIGS. 41-43, a stepped bushing 290 and the outer tube 296 are able to be used. On or more tabs are cut into the bushing flange and the locating protrusions 292 are fit into one or more locating grooves 294 to control the clocking between the stepped bushing 290 and the outer tube 296.

In still further embodiments, such as shown within FIGS. 44-47, a two piece bushing assembly is able to be used. A stepped bushing 310 comprises an upper stepped bushing 312 and a lower stepped bushing 314. On or more steps are cut into the upper stepped bushing 312 and the lower stepped bushing 314 to vary the height of the bushing assembly. The lower stepped bushing 314 comprises a lower stepped bushing keyway boss 316 to keep the lower stepped bushing 314 from rotating relative to the outer tube while the upper stepped bushing 312 is rotated relative to the outer tube to adjust the resting height of the seatpost.

In some embodiments, the stepped bushing such as described above, comprises only one set of bushing seats, such that for any particular telescoping height, the telescoping, movable head assembly of the seatpost contacts only one surface on the stepped bushing.

In some embodiments, the stepped bushing comprises three, four, five or more stepped bushing seats, such that the telescoping, moveable head assembly of the seatpost contacts three, four, five or more bushing seats when extended to its full height, in order to spread the top-out load from the gas spring cartridge more evenly over the stepped bushing.

In further embodiments, the retaining ring is configured so that the stepped bushing is fixedly attached to the lower portion of the retaining ring, and the retaining ring could be rotatably attached to the top of the outer tube with an integrated locking mechanism. In this embodiment, the resting height of the seatpost could be adjusted by lowering the saddle of the seatpost, unlocking the retaining ring, rotating the ring to align the preferred stepped bushing seat or seats with the key or keys in the head tube, then re-locking the retaining ring. This embodiment allows the resting height of the seatpost to be adjusted without opening the sealed portion of the seatpost to the elements, allowing trail-side adjustment of the resting height.

In another embodiment, the stepped bushing contacts some part of the telescoping, movable head assembly of the seatpost other than the keys to control the resting height of the seatpost. For instance a stop surface or multiple stop surfaces could be formed into the seatpost head tube itself, such that these additional stop surfaces contact a seat or seats on the stepped bushing.

In some embodiments, the stepped bushing is made without a flange, inverted, and slides inside the outer tube such that the stepped bushing seats point towards the head of the seatpost. In this configuration, the retaining ring assembly could be formed such that the stepped bushing seats variably interface with the inside surface of the retaining ring, so that rotating the stepped bushing relative to the retaining ring varies the distance the stepped bushing extends down into the outer tube, thereby varying the extended length of the seatpost.

In some embodiments, the outer tube of the seatpost is merged with the seat tube of the bicycle, such that one piece is removed from the bicycle assembly. In this embodiment, the retaining ring would thread onto the top end of the bicycle seat tube, and the inner tube assembly slides down into the seat tube of the bicycle to save weight and complexity of the bicycle. In this embodiment the stepped bushing function allows the seatpost extended length to be adjusted in lieu of using a seatpost clamp and seatpost clamp screw.

In further embodiments, the saddle clamp assembly is formed into the outer tube, and the inner tube assembly is constructed to fit into the bicycle seat tube, effectively inverting the entire assembly. In this embodiment the stepped bushing and seal ring assembly would slide up and down with the outer tube.

Figure 48:
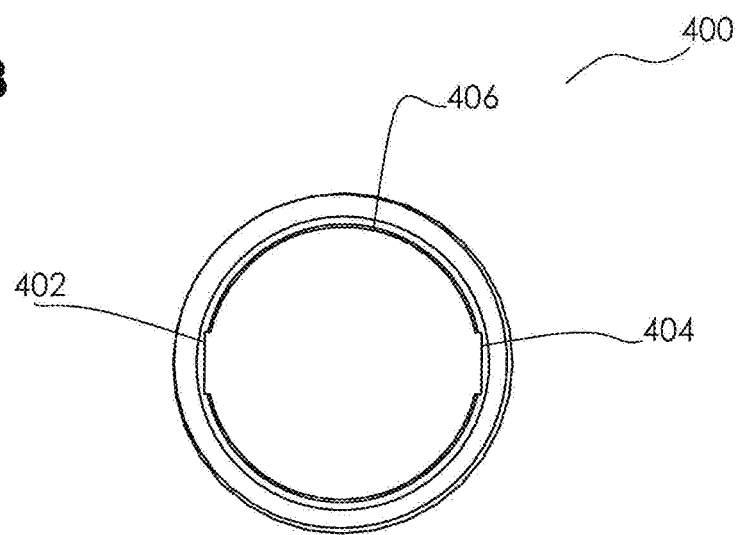
FIG. 48 shows a top view of an outer tube, in accordance with some embodiments.
Figure 49:
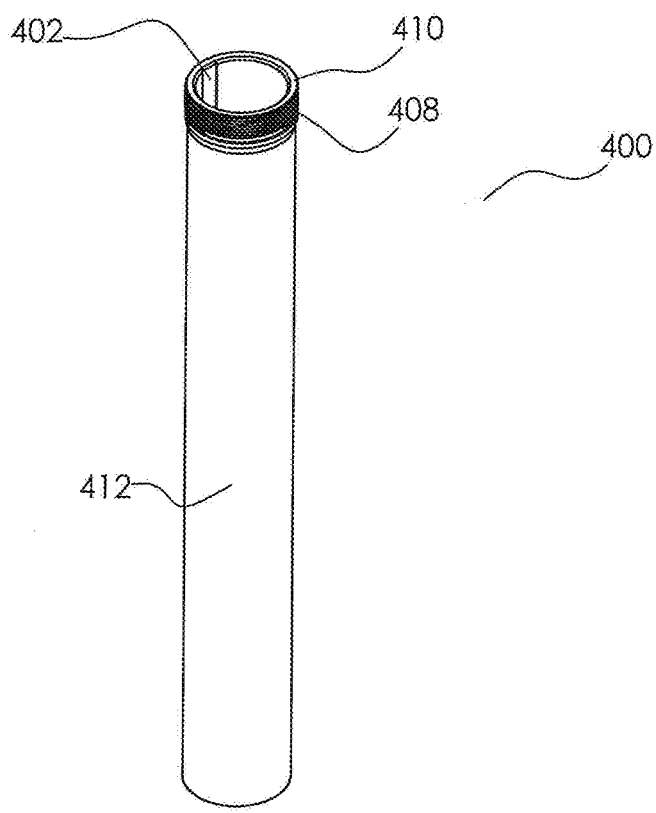
FIG. 49 shows a right rear isometric view of the outer tube, in accordance with some embodiments.

FIG. 48 shows a top view of an outer tube 400 in accordance with further embodiments. The outer tube 400 comprises a left keyway 402, a right keyway 404 and a simplified outertube inner bore 406. FIG. 49 shows a right rear isometric view of the outer tube 400. The outer tube 400 comprises a tube upper thread 408, the left keyway 402, an outer tube top surface 410 an outer tube outer diameter 412.

Figure 50:
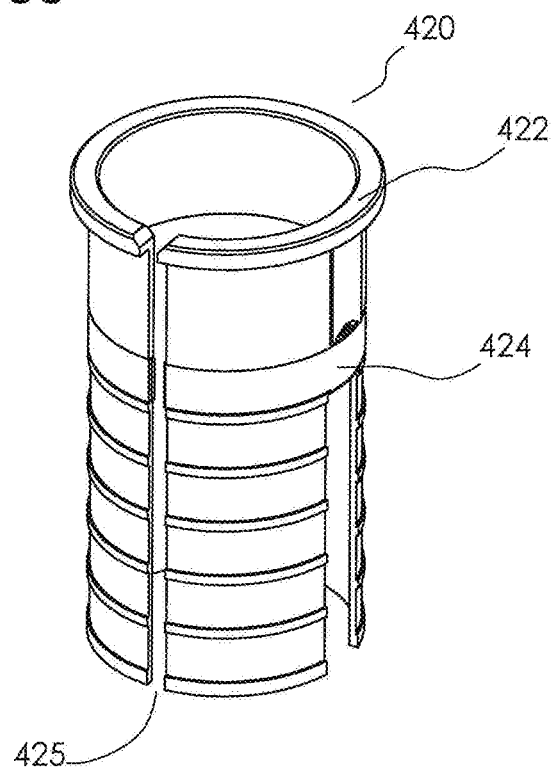
FIG. 50 shows a top rear right isometric view of an adjustable bushing assembly, in accordance with some embodiments
Figure 51:
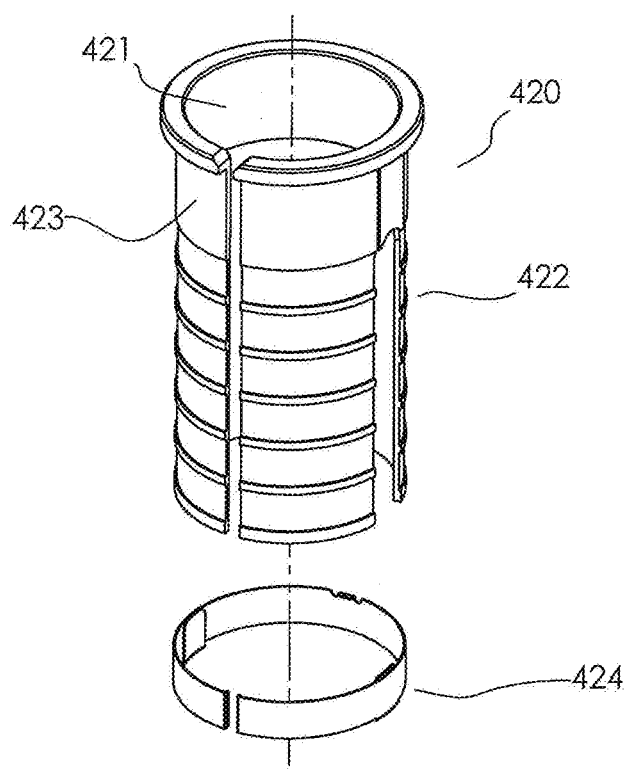
FIG. 51 shows a bushing assembly, in accordance with some embodiments.

FIG. 50 is a top rear right isometric view of an adjustable bushing assembly 420. The adjustable bushing assembly 420 comprises a graduated groove bushing 422 comprising a movable height band 424. The adjustable bushing assembly 420 also comprises a groove bushing slot 425. FIG. 51 shows an exploded view of the bushing assembly 420 showing the graduated groove bushing 422 and the movable height band 424 in a disassembled condition. As shown within FIG. 51, the bushing assembly 420 comprises a groove bushing stanchion bearing surface 421 and a groove bushing bearing support cylinder 423.

Figure 52:
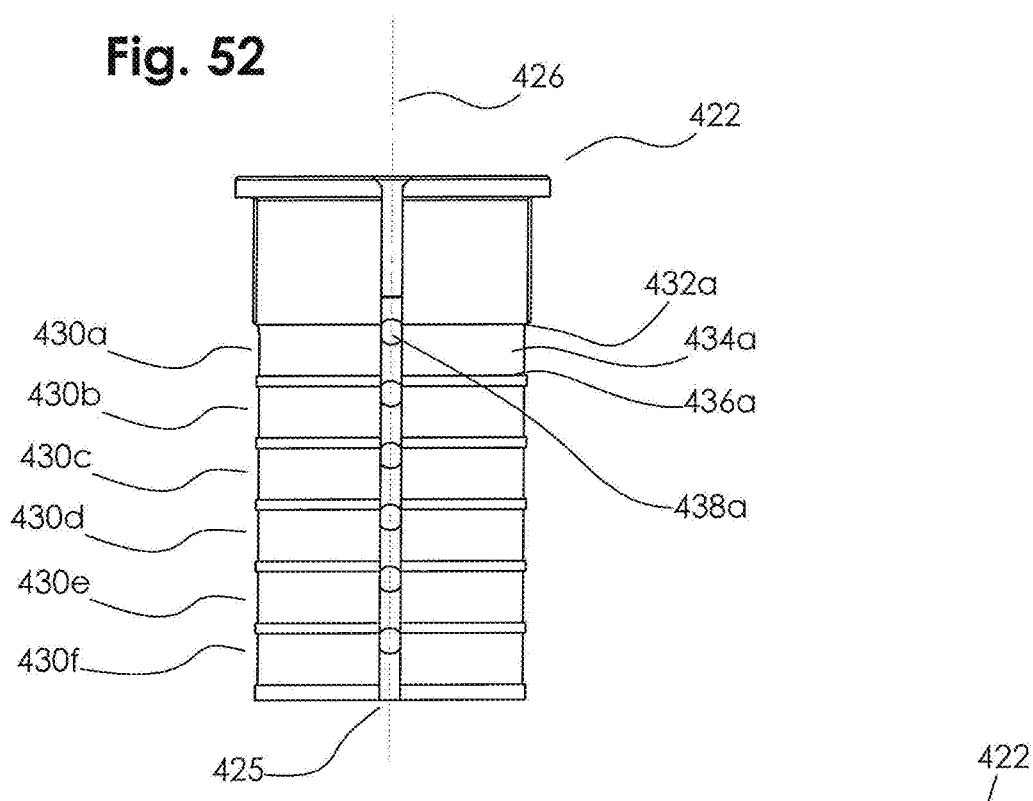
FIG. 52 shows a rear view of a graduated groove bushing, in accordance with some embodiments.
Figure 53:
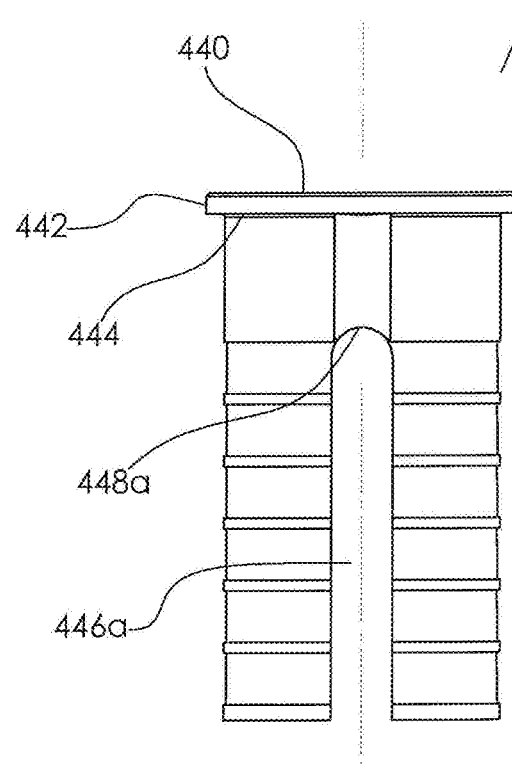
FIG. 53 shows a left side view of a graduated groove bushing, in accordance with some embodiments.

FIG. 52 shows a rear view of the graduated groove bushing 422. The graduated groove bushing 422 comprises a groove bushing center axis 426 and six graduation grooves 430(*a-f*). In some embodiments, a typical graduation groove 430*a* comprises a groove upper surface 432*a*, a groove cylindrical surface 434*a*, a groove lower surface 436*a*, and a groove bushing index hole 438*a*. FIG. 53 is a left side view of the graduated groove bushing 422, comprising a groove bushing flange top 440, a groove bushing flange outside diameter 442 and a groove bushing flange bottom surface 444. As shown within FIG. 53, the graduated groove bushing also comprise the left side key slot 446*a* and the left side key slot end surface 448*a*.

Figure 54:
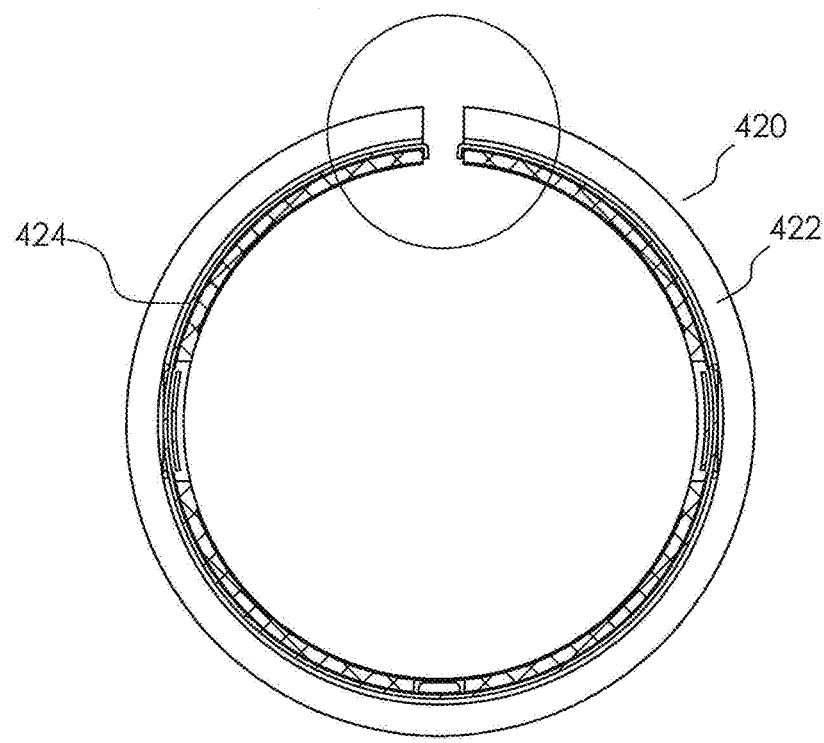
FIG. 54 shows a section view of an adjustable bushing assembly, in accordance with some embodiments.
Figure 55:
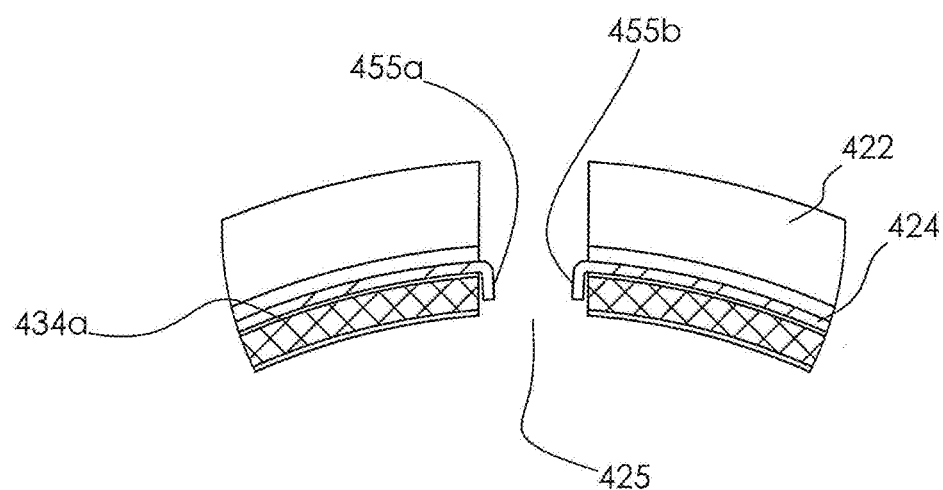
FIG. 55 shows a detail view of an adjustable bushing assembly, in accordance with some embodiments.

FIG. 54 is a section view of the adjustable bushing assembly 420, including the graduated groove bushing 422 and moveable height band 424. FIG. 55 is a detail view of the adjustable bushing assembly 420 showing a close up view of the graduated groove bushing 422 and moveable height band 424, including the left band ear 455a and right band ear 455b. The moveable height band 424 wraps around the groove cylindrical surface 434a and the ears fit into the groove bushing slot 425.

Figure 56:
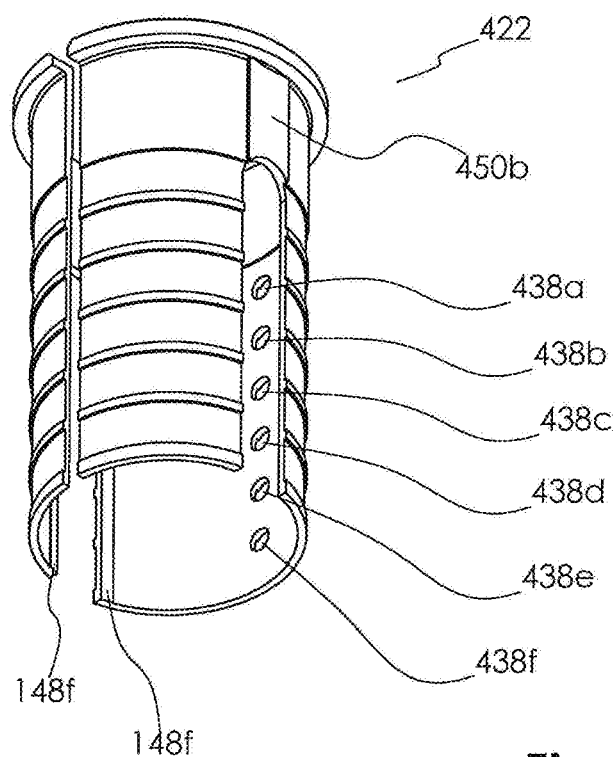
FIG. 56 shows a left lower rear isometric view of a graduated groove bushing, in accordance with some embodiments.
Figure 57:
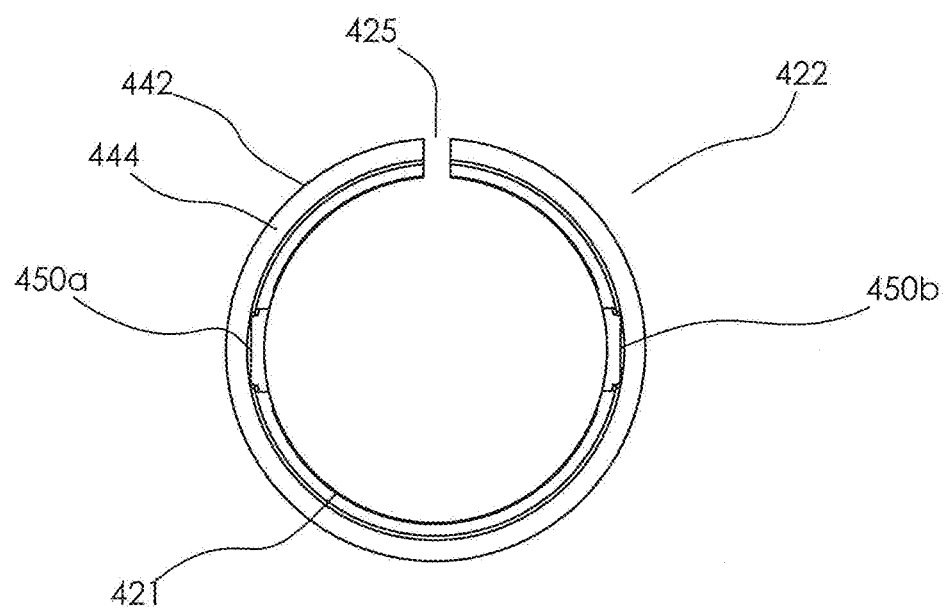
FIG. 57 shows a bottom view of a graduated groove bushing, in accordance with some embodiments.

FIG. 56 is a left lower rear isometric view of the graduated groove bushing 422, showing the groove bushing right key boss 450b, the groove bushing left keyway strakes 452a and 452b and the groove bushing index holes 438(a-f). FIG. 57 is a bottom view of the graduated groove bushing 422, showing the groove bushing slot 425, the groove bushing flange outside diameter 442 and groove bushing flange bottom surface 444. Also shown within FIG. 57 are the groove bushing right key boss 450b, groove bushing left key boss 450a and groove bushing stanchion bearing surface 421.

Figure 58:
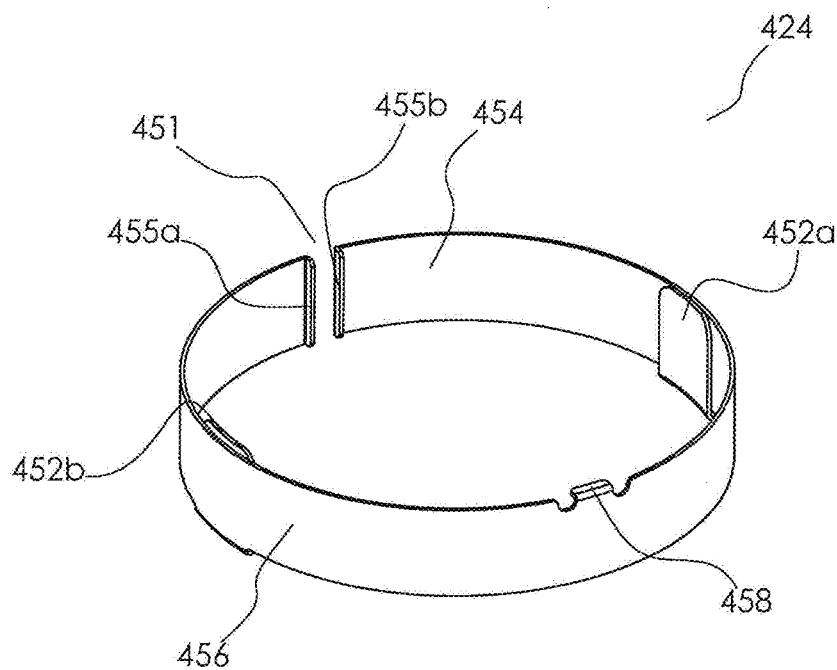
FIG. 58 shows a top front right isometric view of a moveable height band, in accordance with some embodiments.
Figure 59:
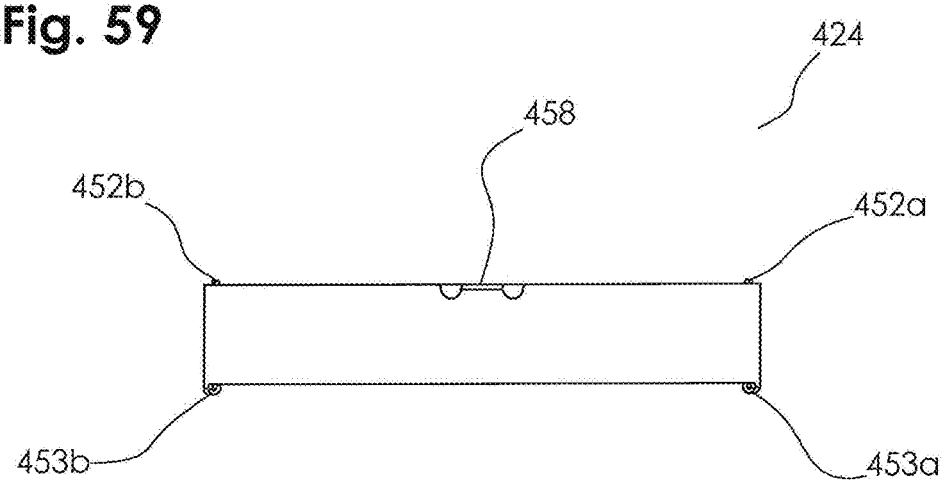
FIG. 59 shows a front view of a moveable height band, in accordance with some embodiments.

FIG. 58 is a top front right isometric view of the moveable height band 424. As shown within FIG. 58, the moveable height band 424 comprises a left band ear 455a, right band ear 455b and band slot 451. FIG. 58 also shows the left band stop tab 452a, right band stop tab 452b, left band stop surface 453a, right band stop surface 453b, and band lock tab 458. FIG. 59 is a front view of the moveable height band 424, showing a left band stop tab 452a, right band stop tab 452b, left band stop surface 453a, right band stop surface 453b, and band lock tab 458.

Figures 60, 61, 62:
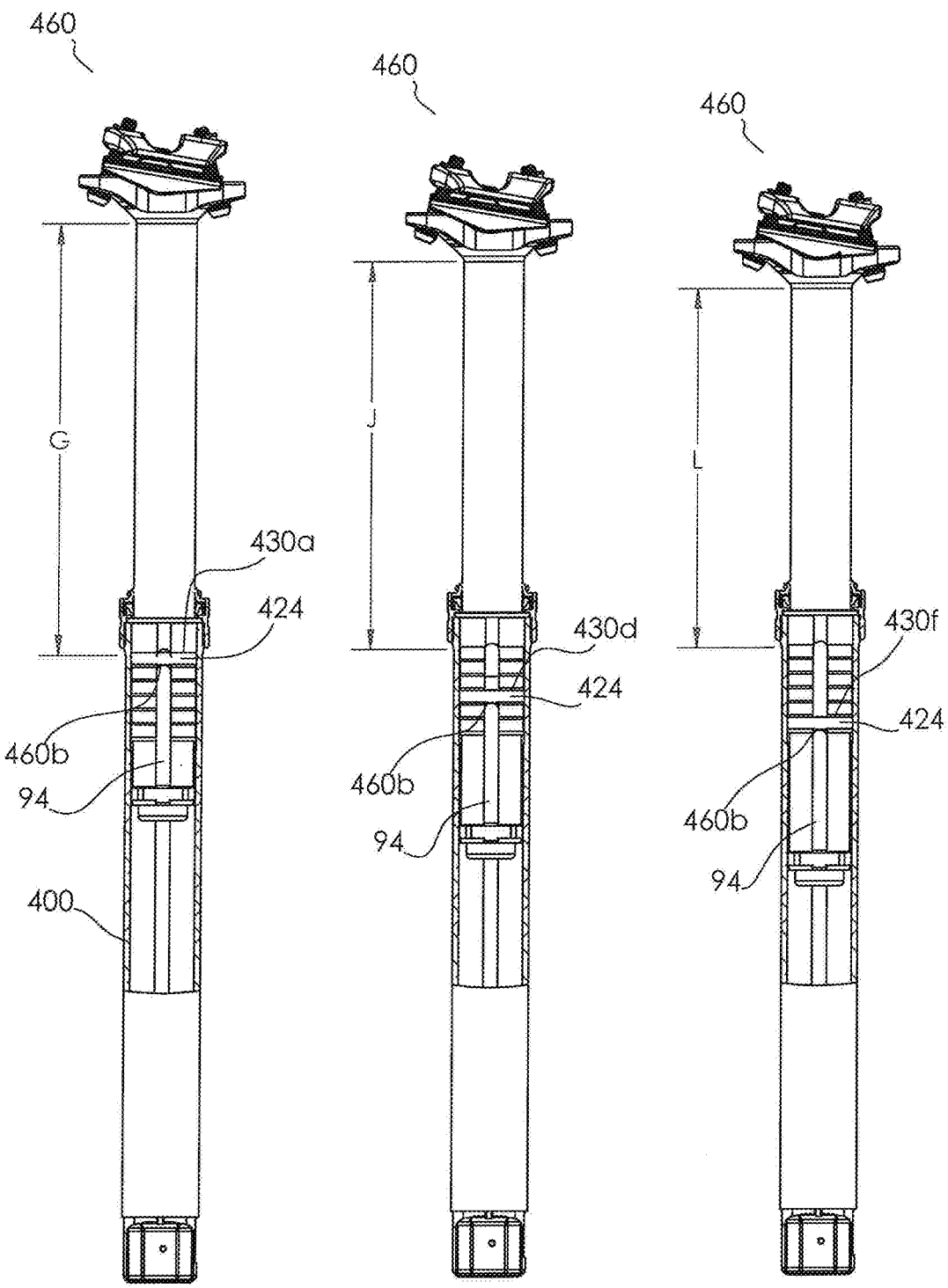
FIG. 60 shows a right side partial section view of a complete seatpost assembly, in accordance with some embodiments.
FIG. 61 shows a right side partial section view of a complete seatpost assembly, in accordance with some embodiments.
FIG. 62 shows a right side partial section view of a complete seatpost assembly, in accordance with some embodiments.

FIG. 60 is a right side partial section view of a complete seatpost assembly 460, with the simplified outer tube 400 cut away to reveal the graduated groove bushing 422 and the right key 94. The complete seatpost assembly 460 is configured for maximum resting height G, with the right key 94 contacting the right band stop tab 452b. FIG. 61 is a right side partial section view of the complete seatpost assembly 460 configured for an intermediate resting height J, with the right key 94 contacting the right band stop tab 452b. FIG. 62 is a right side partial section view of the complete seatpost assembly 460 configured for a minimum resting height L, with the right key 94 contacting the right band stop tab 452b.

Figure 63:
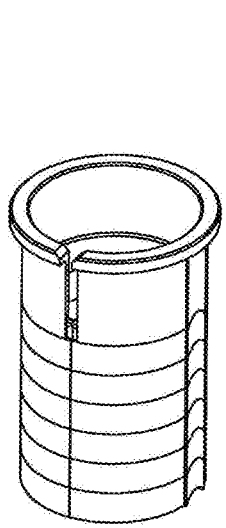
FIG. 63 shows a right rear isometric view of a stacking adjustable bushing assembly, in accordance with some embodiments.
Figure 64:
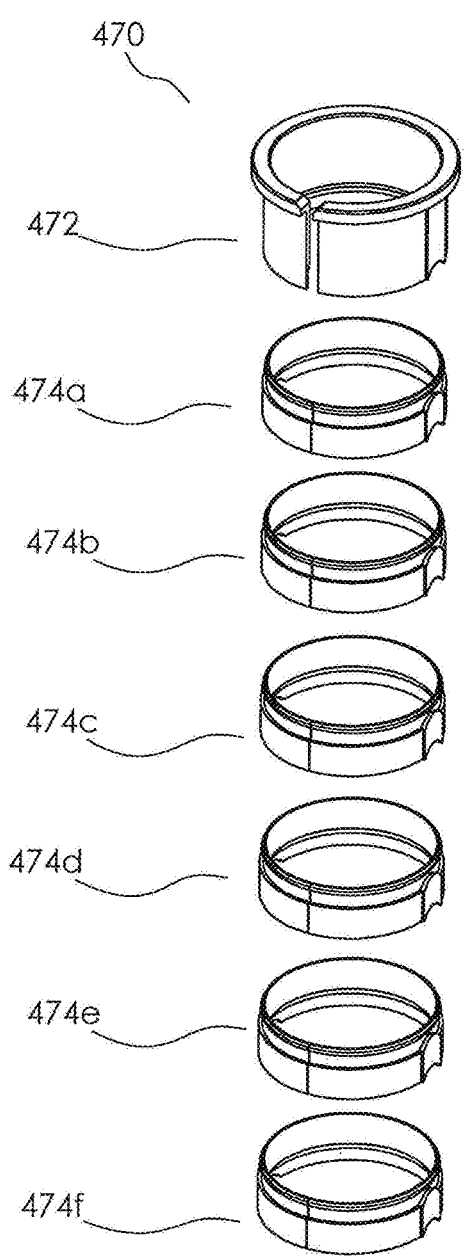
FIG. 64 shows an exploded assembly view of a stacking adjustable bushing assembly, in accordance with some embodiments.

FIG. 63 shows a right rear isometric view of a stacking adjustable bushing assembly 470. FIG. 64 shows an exploded assembly view of the stacking adjustable bushing assembly 470, comprising one stacking base bushing 472, and six identical stacking adjustment rings 474(a-f).

Figure 65:
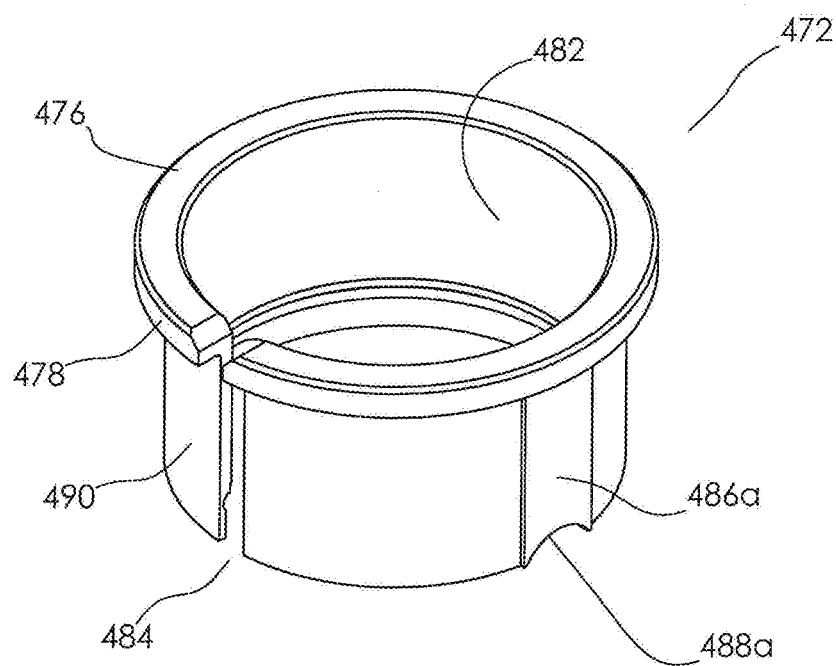
FIG. 65 shows a right rear isometric view of a stacking base bushing, in accordance with some embodiments.
Figure 66:
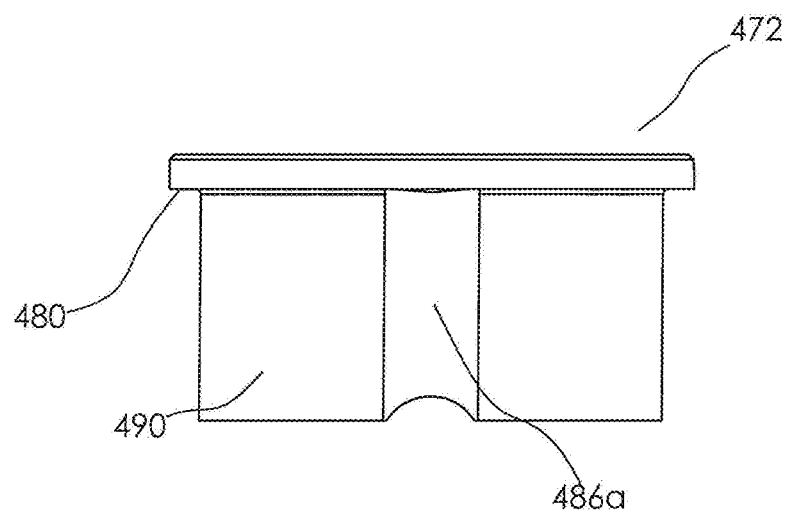
FIG. 66 shows a right view of a stacking base bushing including a stacking base bushing bottom flange surface, in accordance with some embodiments.

FIG. 65 shows a right rear isometric view of the stacking base bushing 472 comprising a stacking base bushing top flange surface 476, a stacking base bushing flange outside diameter 478, a stacking base bushing stanchion support surface 482, a stacking base bushing right locating boss 486a and a stacking base bushing right key seat 488a. Also shown within FIG. 65 is a stacking base bushing slot 484, and a stacking base bushing sleeve diameter 490. FIG. 66 shows a right view of the stacking base bushing 472, including a stacking base bushing bottom flange surface 480.

Figure 67:
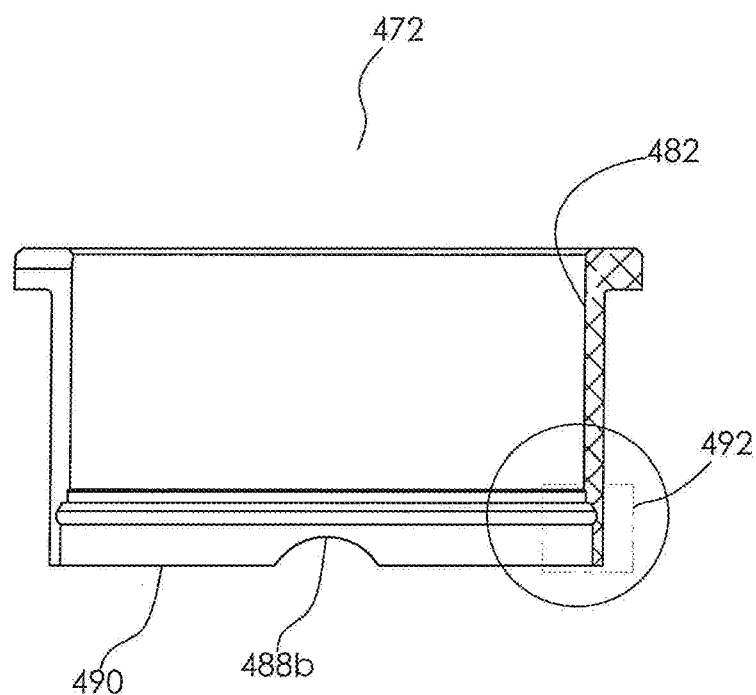
FIG. 67 shows a right section view of a stacking base bushing, in accordance with some embodiments.
Figure 68:
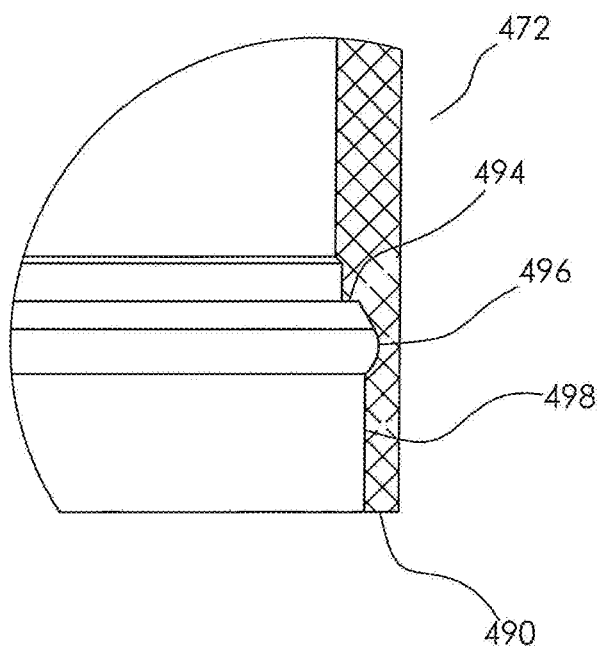
FIG. 68 shows a detail section view of a stacking base bushing, in accordance with some embodiments.

FIG. 67 shows a right section view of the stacking base bushing 472, indicating once again stacking base bushing stanchion support surface 482, stacking base bushing left key seat 488b and stacking base bushing ring surface 491. Circled and indicated is the stacking shim receiving lock feature 492. FIG. 68 is a detail section view of the stacking base bushing 472, focused on the individual features of the stacking shim lock receiving feature 492. The stacking shim lock receiving feature comprises a lock receiving end face 494, a lock receiving external groove 496, a lock receiving clearance cylindrical face 498 and a stacking base bushing ring surface 490.

Figure 69:
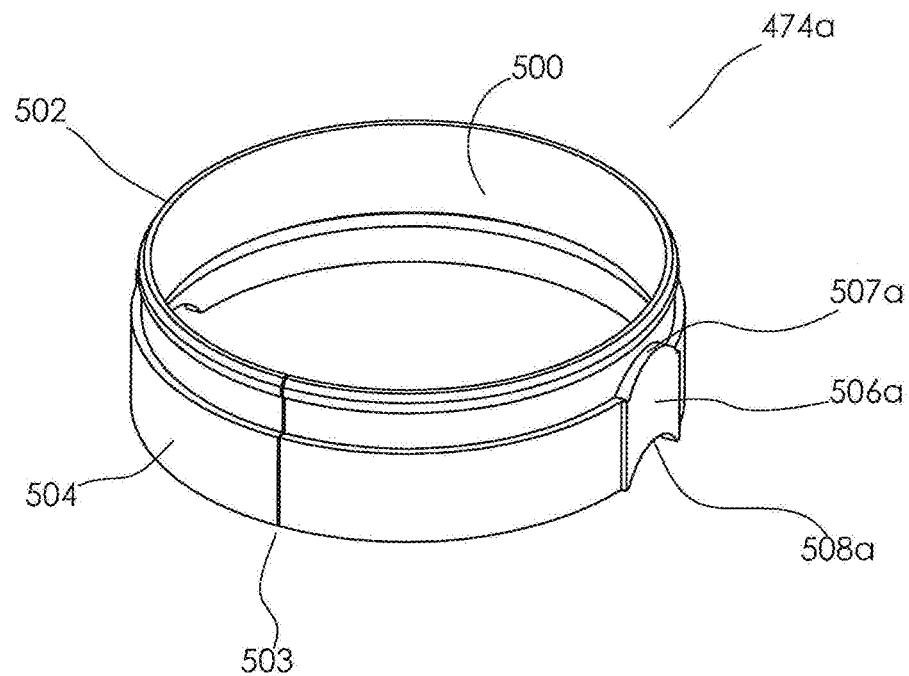
FIG. 69 shows a right rear top isometric view of a stacking adjustment ring, in accordance with some embodiments.
Figure 70:
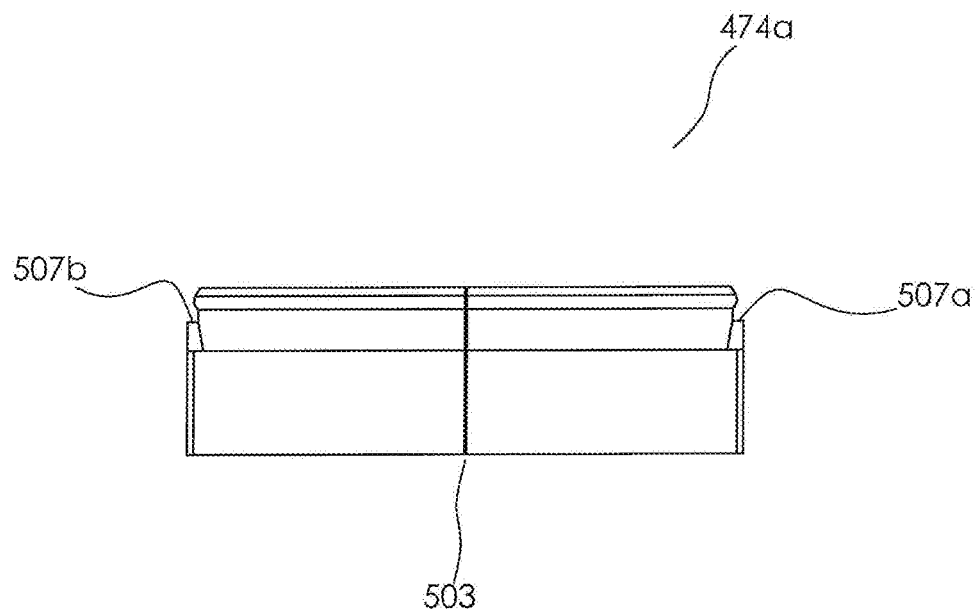
FIG. 70 shows a rear view of a stacking adjustment ring, adjustment ring right key support, adjustment ring left key support, and adjustment ring slot, in accordance with some embodiments.
Figure 71:
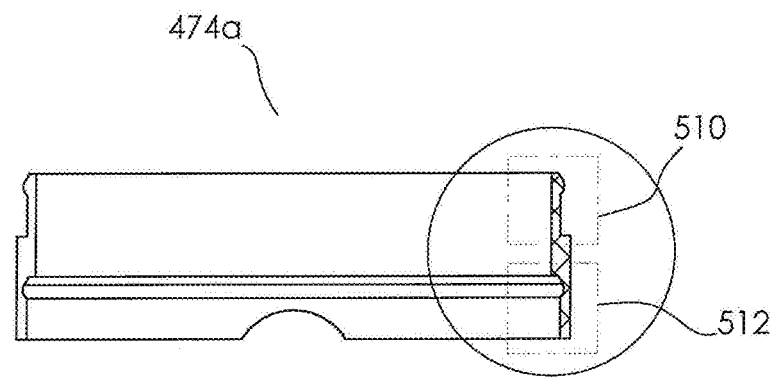
FIG. 71 shows a right section view of a stacking adjustment ring, in accordance with some embodiments.
Figure 72:
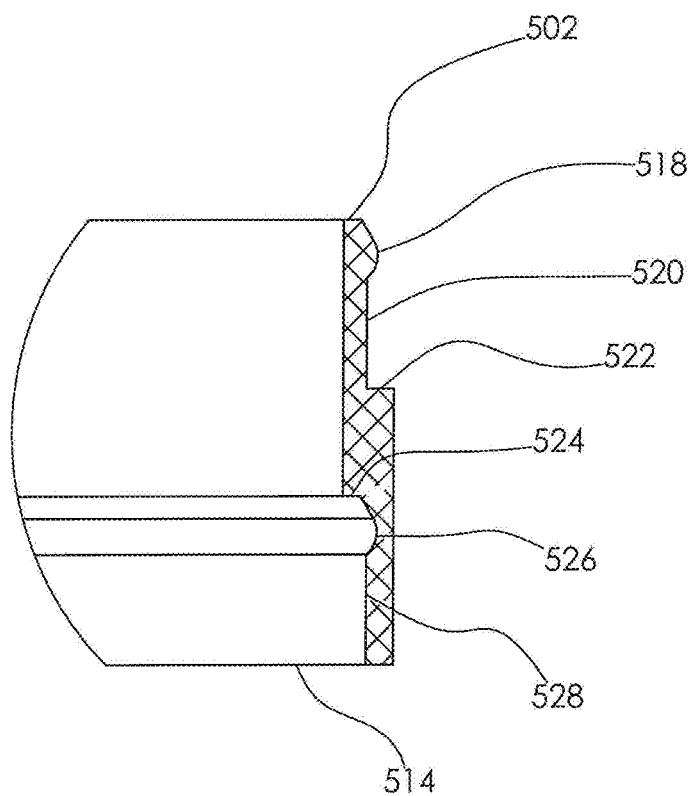
FIG. 72 shows a detail cross section view of a stacking adjustment ring, in accordance with some embodiments.

FIG. 69 is a right rear top isometric view of the stacking adjustment ring 474a. FIG. 69 shows an adjustment ring inner surface 500, an adjustment ring top surface 502, an adjustment ring slot 503, an adjustment ring outside diameter 504, a stacking ring right locating boss 506a, an adjustment ring right key support 507a and an adjustment ring right key seat 508a. FIG. 70 shows a rear view of the stacking adjustment ring 474a, adjustment ring right key support 507a, adjustment ring left key support 507b, and adjustment ring slot 503. FIG. 71 shows a right section view of the stacking adjustment ring 474a comprising an adjustment ring protruding lock feature 510 and adjustment ring receiving lock feature 512. FIG. 72 is a detail cross section view of the stacking adjustment ring 474a, showing adjustment ring top surface 502 and adjustment ring bottom surface 514. Also shown is ring lock receiving end face 524, a ring lock receiving external groove 526, and a ring lock receiving clearance cylindrical face 528. On the upper end of the ring are ring lock flange 518, ring internal clearance face 520, and ring lock support surface 522.

Figure 73:
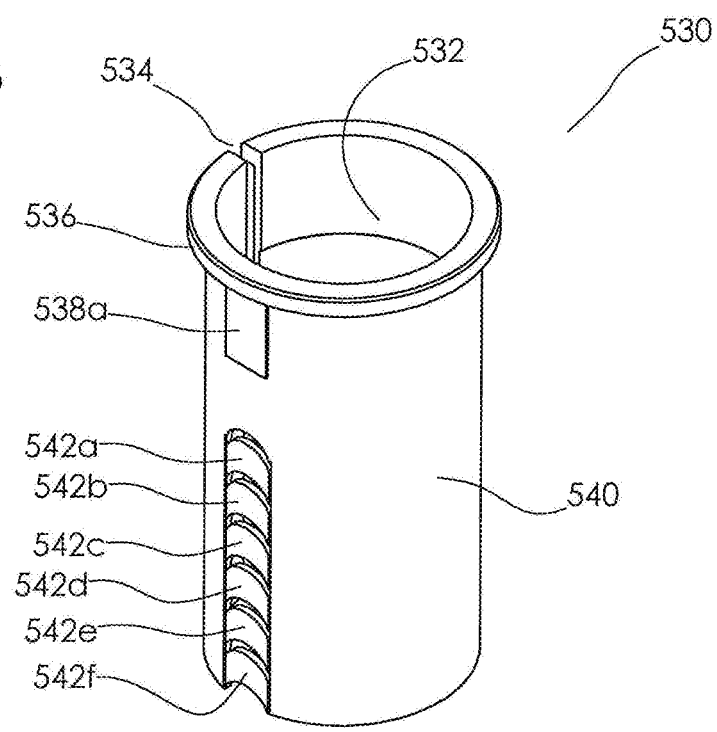
FIG. 73 shows a top front right isometric view of a knock-out height adjust bushing, in accordance with some embodiments.
Figure 74:
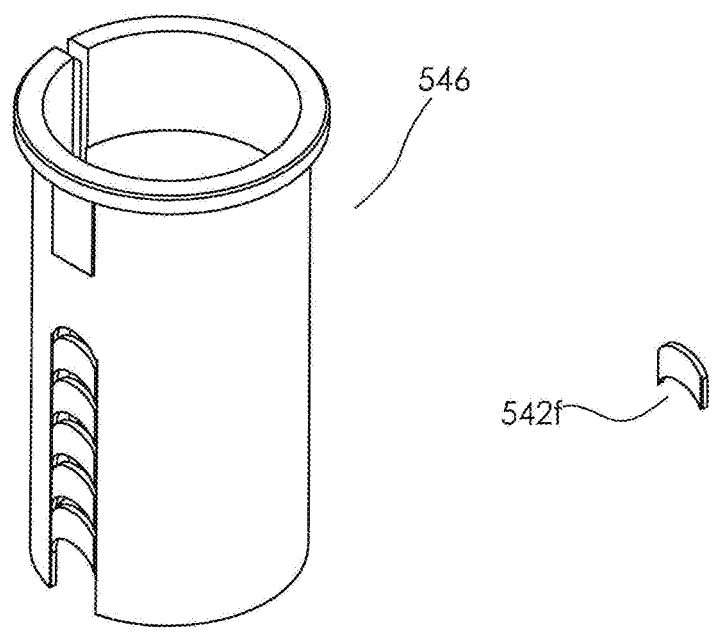
FIG. 74 shows a top front right isometric view of modified knock-out height adjustment bushing, in accordance with some embodiments.
Figure 75:
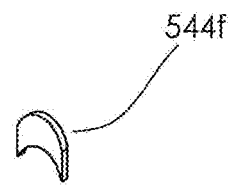
FIG. 75 shows a top front right isometric view of a knock-out bushing segment, in accordance with some embodiments.

FIG. 73 is a top front right isometric view of a knock-out height adjust bushing 530. The bushing comprise a knock-out bushing stanchion support surface 532, a knock-out bushing slot 534, a knock-out bushing flange 536 and a knock-out bushing right locating boss 538a. Also shown within FIG. 73 are right knock-out segments 542(a-f), and knock-out bushing sleeve diameter 540. FIG. 74 shows a top front right isometric view of modified knock-out height adjust bushing 546, which is knock-out height adjust bushing 530 with knock-out bushing segment 542f and knock-out bushing segment 544f removed. FIG. 75 is a top front right isometric view of knock-out bushing segment 542f and knock-out bushing segment 544f.

Figure 76:
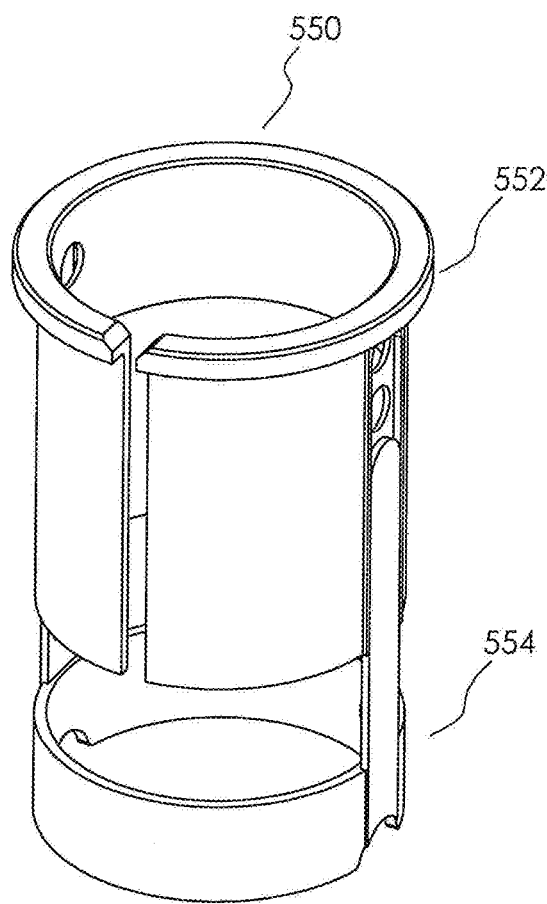
FIG. 76 shows a top rear right view of a snap-together adjustable bushing assembly 550, in accordance with some embodiments.
Figure 77:
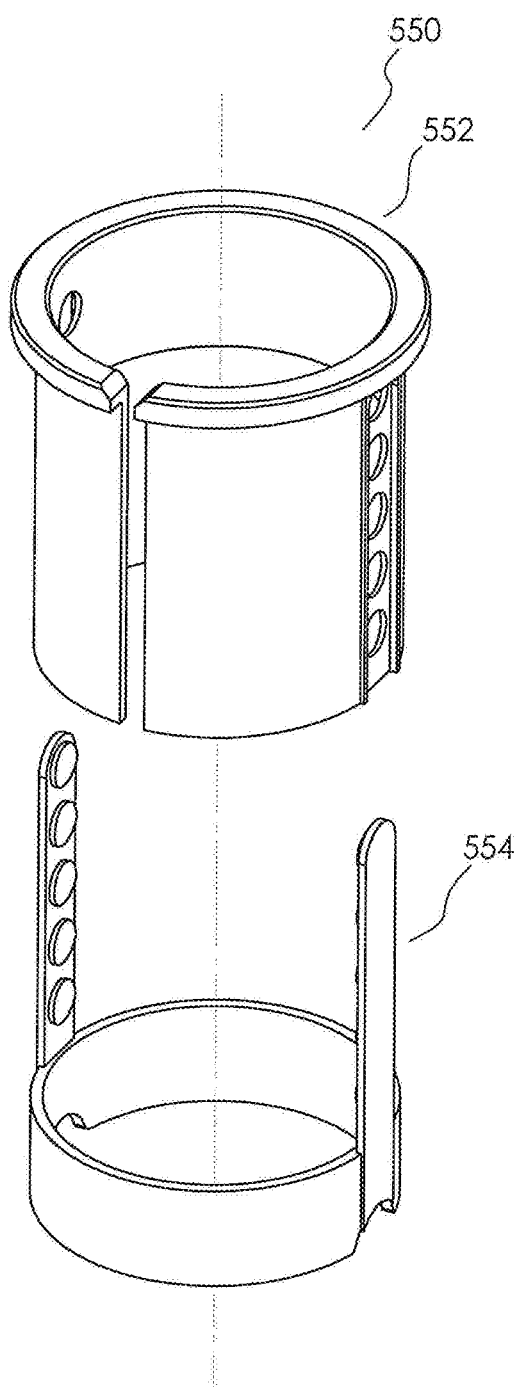
FIG. 77 shows an exploded view of the snap-together adjustable bushing assembly 550, the snap-together bushing base 552 and snap-on travel stop 554.

FIG. 76 is a top rear right view of snap-together adjustable bushing assembly 550, comprising a snap-together bushing base 552 and snap-on travel stop 554. FIG. 77 is an exploded view of the snap-together adjustable bushing assembly 550, the snap-together bushing base 552 and snap-on travel stop 554.

Figure 78:
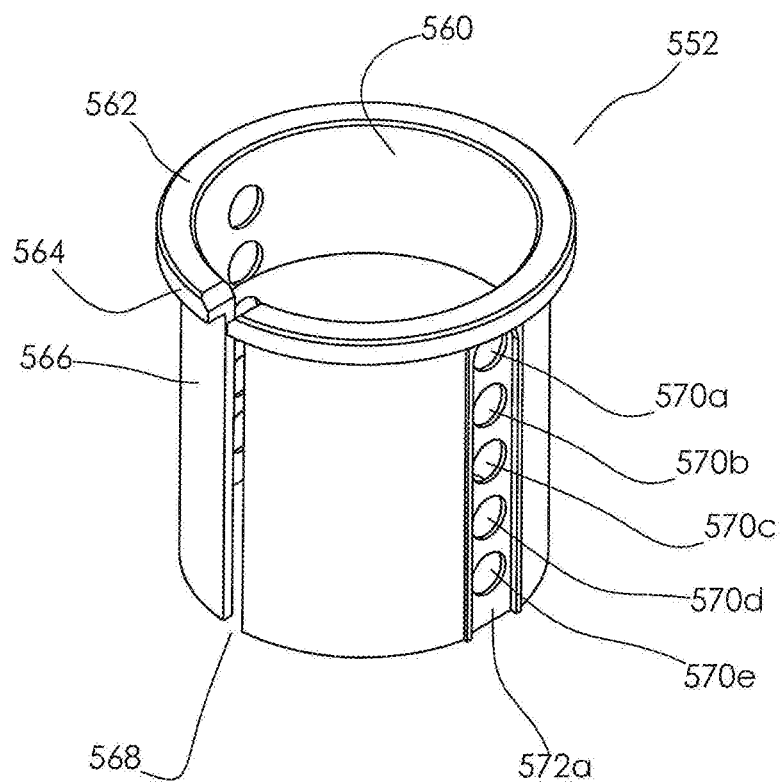
FIG. 78 shows a top rear right isometric view of a snap-together bushing base, in accordance with some embodiments.
Figure 79:
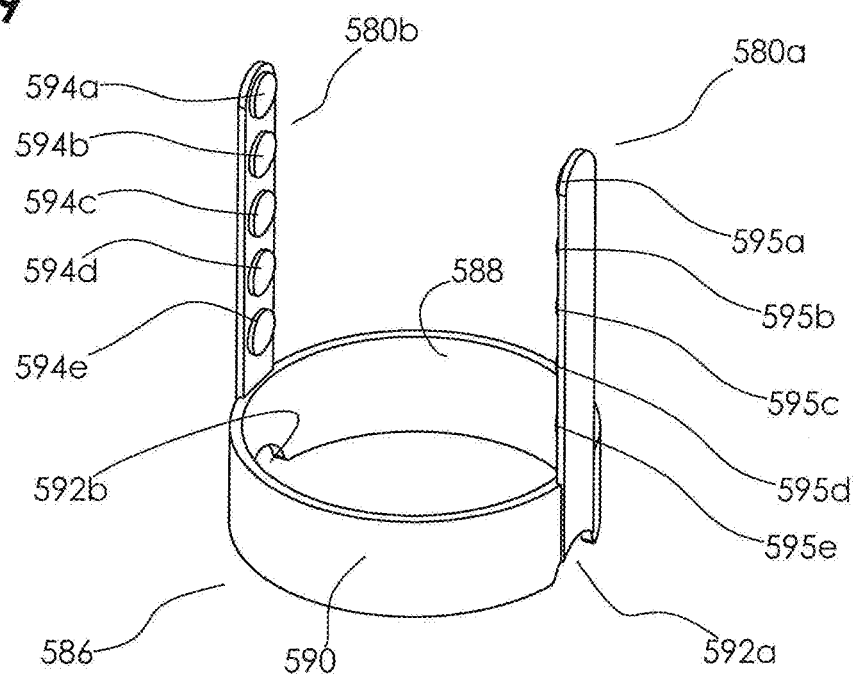
FIG. 79 shows a top rear right isometric view of a snap-on travel stop, in accordance with some embodiments.

FIG. 78 is a top rear right isometric view of the snap-together bushing base 552, comprising a snap-together bushing stanchion support surface 560, a snap-together top surface 562, a snap-together bushing flange 564, a snap-together bushing sleeve diameter 566 and a snap-together bushing slot 568. Also shown are right bushing snap-holes 570(a-e) and bushing snap ear groove 572a. FIG. 79 is a top rear right isometric view of the snap-on travel stop 554, which comprises a left snap ear 580b and right snap ear 580a, an snap-on stop ring 586, a snap-on stop ring outer surface 590, a left snap-on ring key stop 592b and right snap-on ring key stop 592a, and a snap-on stop ring inner bore 588. The left snap ear 580b comprises left snap-in bosses 594(a-e), and right snap ear 580a comprises analogous right snap-in bosses 595(a-e).

In some embodiments, to assemble the telescopic seatpost, the adjustable bushing assembly 420 is fitted into the outer tube 400. A resting height of the seatpost is set by adjusting a location of the moveable height band 424 to one of the plurality of graduation grooves 430(a-f). When the seatpost is extended, at least the right key 94 contacts the right band stop surface 453b, which is prevented from moving upward by the groove upper surface 432a.

The moveable height band 424 is prevented from moving once the seatpost height is set by the groove upper surface 432a, the groove cylindrical surface 434a and a groove lower surface 436a. The groove cylindrical surface 434a and the groove lower surface 436a are sized such that the band 424 fits into place but cannot slide up and down relative to the groove bushing center axis 426. When the bushing is fixed inside the simplified outer tuber inner bore 406, the moveable height band 424 is fully constrained and therefore cannot expand to slide over the bushing in either direction.

To adjust a telescoping height G, the seal cap assembly 220 is unthreaded from the outer tube upper thread 408 and slid up the head tube shaft surface 112. Once the seal cap assembly 220 is out of the way, the actuation cable 50 may be activated so that the gas spring cartridge 98 extends to its full length, which forces the adjustable bushing assembly 420 to extend out of the top of the simplified outer tube 400.

With the adjustable busing assembly 420 accessible to the user, the moveable height band 424 may be opened at the band slot 451, freeing it from the graduation groove 430a. Once the band 424 is freed from the graduation groove 430a, the moveable height band may be reinstalled on any one of the graduation grooves 430(a-f) to select a new resting height.

After the moveable height band 424 is reinstalled on the graduated groove bushing 422, the bushing 422 is slid down the head tube shaft surface 112 and engages the groove bushing right key boss 450b into the alternative right keyway 404.

The moveable height band 424 has additional features to control the movement of the band 424 relative to the graduated groove bushing 422 in addition to the relative size of the groove and the band 424. First, the left band ear 455a and the right band ear 455b fit into the groove bushing slot 425. Additionally, the moveable height band 424 may be made from thin, flexible material to allow the left band ear 455a and the right band ear 455b to snap into place over the graduated groove bushing 422 so that once the bushing 422 is slid into the outer tube 400, the left band ear 455a and the right band ear 455b are constrained by the simplified outer bore 406 leaving no room for the ring to expand.

On the opposite side of the moveable height band 424 is a band lock tab 458, which fits into one of the groove bushing index holes 438(a-f) aligned with the graduation grooves 430(a-f) when in use. With the tab 458 inserted into one of the index holes 438(a-f), the tab 458 is constrained by the outer tube inner bore 406, the band 424 is fixed in place relative to the bushing.

As would be apparent to someone of ordinary skill in the art, the dimensions of the band 424 and the number of index holes and grooves are able sized and designed according to engineering and product design considerations. For example, the number of graduations on the bushing and the height of the adjustment ring may be altered to allow for more or less steps of adjustment and to allow coarser or finer adjustment of the seatpost height as appropriately desired. For example, although two keys are shown to control the seatpost height, any number of appropriately desired keys such as one, two, three, four or more may be incorporated to improve seatpost function as necessary and to deal with localized stress in the height adjustment ring where the key contacts the ring.

In some embodiments, the topmost height setting is used by removing the moveable height band 424 entirely from the assembly.

In some embodiments, a stacking adjustable bushing assembly is fitted into the outer tube 400. A resting height of the seatpost is able to be set by including more or less stacking adjustment rings 474(a-f) once the assembly is freed from the outer tube 400.

In some embodiments, the stacking base bushing 472 and the stacking adjustment rings 474(a-f) are made from a compliant material such that the stacking adjustment rings 474(a-f) may be removed from the head tube shaft surface 112 by flexing the bushings or rings open at their respective slots, stacking base bushing slot 484 and adjustment ring slot 503. However, when the stacking adjustable bushing assembly 470 is fitted into the outer tube 400 the rings are constrained on the outside by the simplified outer tube inner bore 406, and cannot open. Therefore the vertical force applied on the stacking adjustment rings 474(a-f) applied by the right key 94 is transferred directly upward from each adjustment ring right key seat 508a to each adjustment ring right key support 507a and ultimately into the stacking base bushing right key seat 488a.

The stacking base bushing 472 and stacking adjustment rings 474(a-f) are keyed to the outer tube 400 using at least one of the stacking base bushing right locating boss 486a and stacking ring right locating boss 506a. The resting height of the seatpost is controlled by contact between the right key 94 and one of either the adjustment ring right right key seat 508(a-f) or stacking base bushing right key seat 488a if all of the stacking rings are removed.

A stacking adjustment ring 474a may be affixed to the stacking stacking base bushing 472 by flexing open the base bushing at stacking base bushing slot 484, flexing open the adjustment ring at adjustment ring slot 503 and snapping it over head tube shaft surface 112 below the stacking base bushing 472 and fitting the ring lock flange 518 into the lock receiving external groove 496.

Once the bushing assembly 470 is slid into the outer tube 400 the pieces will be locked together and constrained by the simplified outer tube inner bore 406 on the outside and the head tube shaft surface 112 on the inside. To adjust the resting height of the seatpost stacking rings may be added or subtracted from the assembly. In some embodiments, a height of the stacking rings and a number of the stacking rings may be varied as appropriately desired to allow coarser or finer adjustment in the seatpost height.

Additionally, in some embodiments, the bushing pieces are fabricated from any appropriate desired material such as engineering plastics, which may provide suitable bearing properties for the sliding motion in the seatpost, and also allow the individual bushing pieces to be flexed open to fit over, and be removed from, head tube shaft surface 112 as necessary for adjustment.

In further embodiments, a knock-out height adjust bushing 530 is fitted into the outer tube 400. The resting heights of the seatpost may then be set by removing one or more knock-out bushing segment 542(a-f) in order to adjust the contact of right key 94 and knock-out bushing segment 542f.

In some embodiments, a knock-out height adjust bushing 530 is included with the seatpost, and permanently modified by the user to set the resting height of the seatpost. Once altered, the seatpost height may not be lowered again without replacing the entire knock-out height adjust bushing 530.

To set the height of the seatpost, the knock-out height adjust bushing 530 is slid up head tube shaft surface 112 and the knock-out bushing segment 542f and knock-out bushing segment 544f may be cut away from the now modified knock-out height adjust bushing 530. A right knock-out bushing right locating boss 538a is fitted into an alternative right keyway 404 such that the right key 94 always contacts one of the knock-out bushing segment 542(a-f) as they are removed.

In some embodiments, if the knock-out height adjust bushing 530 is made from a plastic polymer material, knock-out bushing segment 542(a-f) may be easily removed with commonly available cutting tools such as diagonal pliers or a utility knife.

In some embodiments, the adjustable bushing assembly 550 fitted into the outer tube 400. The resting heights of the seatpost may be set by adjusting the relative position of snap-on travel stop 554 to snap-together bushing base 552.

To adjust the resting height of the seatpost, the snap-together adjustable bushing assembly 550 is slid out of the second alternative outer tube 400 along the head tube shaft surface 112, then the right snap ear 580a is flexed away from the head tube shaft surface 112 so that one or more left snap-in bosses 595(a-e) disengage from one or more right bushing snap-holes 570(a-e). If more than one ear is present in the assembly, all ears would be flexed in such a manner as to disengage each snap from it's corresponding hole.

To set the resting height of the seatpost, more or less snap bosses are engaged with snap holes to raise or lower the resting position of a right snap-on ring key stop 592a. The resting location of the snap-on travel stop 554 controls the resting height of the seatpost through contact between the right snap-on ring key stop 592a and right key 94.

In operation, a telescopic bicycle seatpost is able to be installed on many different bicycle sizes, for riders of different heights and leg length, while maximizing the telescoping length of the seatpost for each situation and without requiring many different lengths of seatposts to be manufactured. The telescoping length of the seatpost may be adjusted for riders of different heights, fit many different frame sizes and enable each rider to maximize the telescoping length of the seatpost for their particular bike and desired setup.

Additionally, the telescopic bicycle seatpost enables the telescopic length of the seatpost to be adjusted after the seatpost has been installed on the bicycle and without removing the seatpost from the frame. Particularly, because many bicycle framed require routing seatpost control cables inside the frame, adjusting a telescopic length of the seatpost without removing it from the frame saves a significant amount of time and frustration for the user. This also enables the frame and seatpost combination to be quickly adjusted for different users of the same bicycle, in instances where the bicycle is shared between two or more riders or is used as part of a rental fleet. As such, the telescoping bicycle seatpost with adjustable uncompressed resting height as described herein has many advantages.

The telescopic bicycle seatpost has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiments chosen for illustration without departing from the spirit and scope of the invention.

We claim:
1. A telescopic bicycle seatpost comprising:
   a. an outer tube;
   b. an adjustable bushing assembly fitted into the outer tube, wherein the adjustable bushing assembly comprises:
      i. a body having a plurality of graduation grooves, wherein each of the plurality of graduation grooves extends along a majority of a perimeter of the body; and
   c. a moveable height band movable between the plurality of graduation grooves to move an uncompressed resting height of the telescopic bicycle seatpost.

2. The telescopic bicycle seatpost of claim 1, wherein each of the plurality of graduation grooves comprises a groove upper surface, a groove cylindrical surface and lower groove surface for locking the moveable height band in one of the plurality of graduated grooves.

3. The telescopic bicycle seatpost of claim 1, wherein the moveable height band comprises a band slot that is opened to free the moveable height band from one of the plurality of grooves to move the moveable band to a different graduation groove.

4. The telescopic bicycle seatpost of claim 1, wherein the moveable height band comprises a left band ear and a right band ear which fit into a groove bushing slot of the adjustable bushing assembly to lock the moveable height band in place.

5. A telescopic bicycle seatpost comprising:
   a. an outer tube;
   b. an adjustable bushing assembly fitted into the outer tube, wherein the adjustable bushing assembly comprises:
      i. a plurality of graduation grooves; and
   c. a moveable height band movable between the plurality of graduation grooves to move an uncompressed resting height of the telescopic bicycle seatpost, wherein the moveable height band comprises a band lock tab which fits within one of a plurality of groove bushing index holes aligned with the graduation groove that is in use.

6. A method of setting an uncompressed resting height of a bicycle seatpost comprising:
   providing an adjustable bushing assembly fitted into an outer tube, wherein the adjustable bushing assembly comprises a body having a plurality of graduation grooves, wherein each of the plurality of graduation grooves extends along a majority of a perimeter of the body; and
   positioning a moveable height band within one of the plurality of graduation grooves to adjust the uncompressed resting height of the telescopic bicycle seatpost.

7. The method of claim 6, wherein the moveable height band comprises a band slot that is opened to free the moveable height band from one of the plurality of grooves to move the moveable band to a different graduation groove.

8. The method of claim 6, wherein the seatpost is not removed from the bicycle as the uncompressed resting height is set.

9. A method of setting an uncompressed resting height of a bicycle seatpost comprising:
   providing an adjustable bushing assembly fitted into an outer tube, wherein the adjustable bushing assembly comprises a plurality of graduation grooves; and
   positioning a moveable height band within one of the plurality of graduation grooves to adjust the uncompressed resting height of the telescopic bicycle seatpost, wherein each of the plurality of graduation grooves comprises a groove upper surface, a groove cylindrical surface and lower groove surface for locking the moveable height band in one of the plurality of graduated grooves.

10. A method of setting an uncompressed resting height of a bicycle seatpost comprising:
   providing an adjustable bushing assembly fitted into an outer tube, wherein the adjustable bushing assembly comprises a plurality of graduation grooves; and
   positioning a moveable height band within one of the plurality of graduation grooves to adjust the uncompressed resting height of the telescopic bicycle seatpost, wherein the moveable height band comprises a left band ear and a right band ear which fit into a groove bushing slot of the adjustable bushing assembly to lock the moveable height band in place.

11. A method of setting an uncompressed resting height of a bicycle seatpost comprising:
   providing an adjustable bushing assembly fitted into an outer tube, wherein the adjustable bushing assembly comprises a plurality of graduation grooves; and
   positioning a moveable height band within one of the plurality of graduation grooves to adjust the uncompressed resting height of the telescopic bicycle seatpost, wherein the moveable height band comprises a band lock tab which fits within one of a plurality of groove bushing index holes aligned with the graduation groove that is in use.

* * * * *